US012666036B2

(12) United States Patent　　　　(10) Patent No.:　US 12,666,036 B2

Filippov et al.　　　　　　　　　　(45) Date of Patent:　　　Jun. 23, 2026

(54) INTRA PREDICTION WITH MULTIPLE PRECISION OF ANGULAR PARAMETERS

(71) Applicant: Ofinno, LLC, Reston, VA (US)

(72) Inventors: Alexey Konstantinovich Filippov, Khimki (RU); Vasily Alexeevich Rufitskiy, Vladimir (RU); Esmael Hejazi Dinan, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/621,535

(22) Filed: Mar. 29, 2024

(65) Prior Publication Data

US 2024/0259565 A1　　Aug. 1, 2024

Related U.S. Application Data

(63) Continuation of application No. PCT/US2022/045267, filed on Sep. 29, 2022.

(60) Provisional application No. 63/250,150, filed on Sep. 29, 2021.

(51) Int. Cl.
　　*H04N 19/139*　　　(2014.01)
　　*H04N 19/132*　　　(2014.01)
　　*H04N 19/159*　　　(2014.01)
(52) U.S. Cl.
　　CPC ......... *H04N 19/139* (2014.11); *H04N 19/132* (2014.11); *H04N 19/159* (2014.11)
(58) Field of Classification Search
　　CPC .. H04N 19/139; H04N 19/132; H04N 19/159; H04N 19/11; H04N 19/176; H04N 19/70; H04N 19/105
　　See application file for complete search history.

(56) References Cited

U.S. PATENT DOCUMENTS

| | | | |
|---|---|---|---|
| 11,627,337 B2 | 4/2023 | Yamamoto et al. | |
| 2013/0114713 A1 | 5/2013 | Bossen et al. | |
| 2016/0050422 A1 | 2/2016 | Rosewarne et al. | |
| 2018/0255304 A1 * | 9/2018 | Jeon ..................... | H04N 19/134 |
| 2019/0200011 A1 | 6/2019 | Yoo et al. | |
| 2020/0162728 A1 | 5/2020 | Van der Auwera et al. | |
| 2020/0304832 A1 | 9/2020 | Ramasubramonian et al. | |

(Continued)

OTHER PUBLICATIONS

Ling Liao Riu; Fix the absinvAngle shift 1-17 number of TIMD modes; Sep. 16, 2021; Retrieved from the Internet: URL: https:// vcgit. hhi.fraunhofer.de/ecm/ECM/-/merge_requests/16? commit_ id=34b75ebd78eb830eaa?2 1762be76af857f6c23f03. (Year: 2021).*

(Continued)

*Primary Examiner* — Hesham K Abouzahra
(74) *Attorney, Agent, or Firm* — Willis H. Chang; Kavon Nasabzadeh; Jacob L. Mangan

(57)　　　　　　ABSTRACT

A coder (e.g., an encoder or decoder) determines an inverse angle of an intra prediction mode angle based on: the intra prediction mode angle, and an indication of a precision of the intra prediction mode angle. The indication indicates the precision of the intra prediction mode angle from at least two different precisions. The coder determines a fractional projected displacement by dividing a product, of the inverse angle and a position of a supplementary sample, by a value used for each of the at least two different precisions. The coder calculates the supplementary sample based on an integer part of the fractional projected displacement.

20 Claims, 23 Drawing Sheets

(56)               References Cited

U.S. PATENT DOCUMENTS

| | | |
|---|---|---|
| 2020/0374517 A1 | 11/2020 | Liu et al. |
| 2020/0404281 A1 | 12/2020 | Ramasubramonian et al. |
| 2020/0404325 A1 | 12/2020 | Ramasubramonian et al. |
| 2021/0127110 A1 | 4/2021 | Filippov et al. |
| 2021/0227208 A1 | 7/2021 | Lee |
| 2021/0289197 A1 | 9/2021 | Ko et al. |
| 2022/0150541 A1* | 5/2022 | Liu ...................... H04N 19/82 |
| 2022/0224938 A1 | 7/2022 | Ruiz Coll et al. |
| 2022/0312034 A1 | 9/2022 | Rath et al. |
| 2022/0345712 A1 | 10/2022 | Filippov et al. |
| 2022/0360774 A1 | 11/2022 | Bossen |
| 2023/0291930 A1 | 9/2023 | Liu et al. |

OTHER PUBLICATIONS

JVET-V0098-v2; Joint Video Experts Team (JVET) of ITU-T SG 16 WP 3 and ISO/IEC JTC 1/SC 29; 22nd Meeting, by teleconference, Apr. 20-28, 2021; Title: EE2-related: Template-based intra mode derivation using MPMs; Status: Input document to JVET; Purpose: Proposal; Author(s): Yang Wang et al.; Source: Bytedance Inc.
JVET-W0123-v2; Joint Video Experts Team (JVET) of ITU-T SG 16 WP 3 and ISO/IEC JTC 1/SC 29; 23rd Meeting, by teleconfer-ence, Jul. 7-16, 2021; Title: EE2-related: Fusion for template-based intra mode derivation; Status: Input document to JVET; Purpose: Proposal; Author(s): Keming Cao et al.; Source: Qualcomm Incor-porated, Bytedance Inc.
International Search Report and Written Opinion of the Interna-tional Searching authority mailed Jan. 12, 2023, in International Application No. PCT/US2022/045267.
Ling Liao Riu; Fix the absinvAngle shift 1-17 number of TIMD modes; Sep. 16, 2021; Retrieved from the Internet: URL: https://vcgit.hhi.fraunhofer.de/ecm/ECM/-/merge_requests/16?commit_id=34b75ebd78eb830eaa21762be76af857f6c23f03.
Ling Liao Ru et al.; Fix the absinvAngle shift number of TIMD modes; Sep. 16, 2021; Retrieved from the Internet: URL: https://vcgit.hhi.fraunhofer.de/ecm/ECM/-/merge_requests/16/diffs?commit_id=34b75ebd78eb830eaa21762be76af857f6c23f03.
Alexey Filippov et al.; Non-EE2: Unification of negative modes processing in Timd; JVET-X0122; Oct. 12, 2021; Retrieved from the Internet: URL: https://jvet-experts.org/doc_end_user/documents/24_Teleconference/wgll/JVET-X0122-v2.zip JVET-X0122-vl.pdf.
Alexey Filippov et al.; Document: JVET-X0122-v1; Joint Video Experts Team (JVET) of ITU-T SG 16 WP 3 and 1S0/ IEC JTC 1/SC 29; 24th Meeting, by teleconference, Oct. 11-15, 2021; Title: Non-EE2: Unification of negative modes processing in TIMD.

* cited by examiner

*400*

*500*

Vertical Binary Tree Partition
602

Horizontal Binary Tree Partition
604

Vertical Ternary Tree Partition
606

Horizontal Ternary Tree Partition
608

0: Planar
1: DC

0: Planar
1: DC

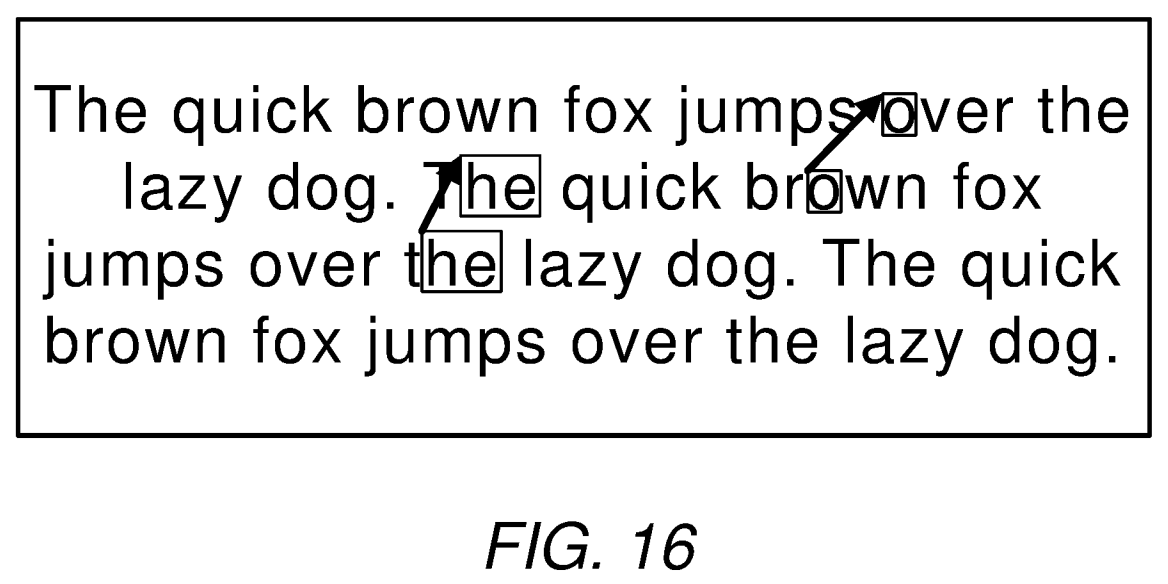

The quick brown fox jumps over the lazy dog. The quick brown fox jumps over the lazy dog. The quick brown fox jumps over the lazy dog.

*FIG. 16*

Figure 22:
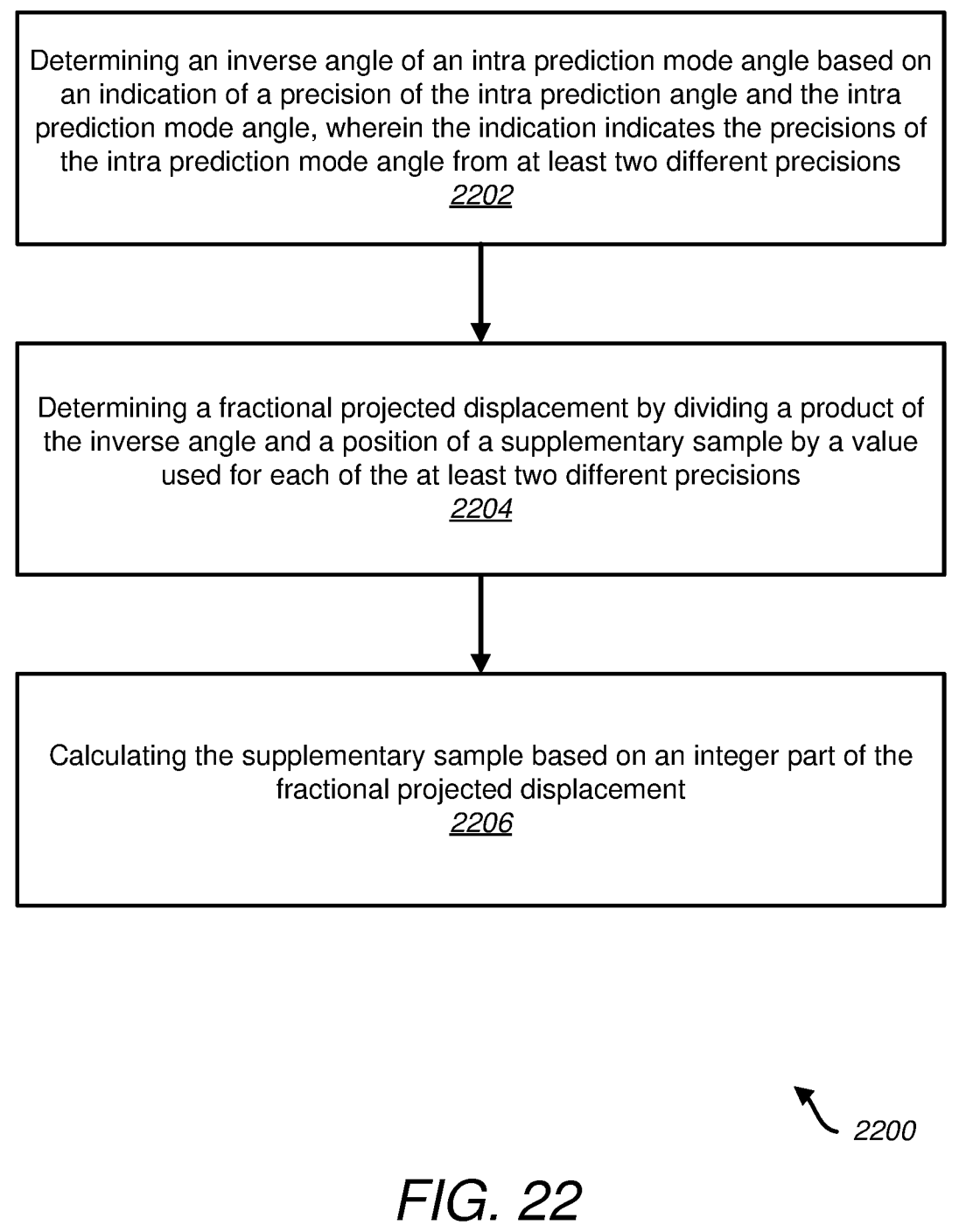

Determining an inverse angle of an intra prediction mode angle based on an indication of a precision of the intra prediction angle and the intra prediction mode angle, wherein the indication indicates the precisions of the intra prediction mode angle from at least two different precisions
*2202*

Determining a fractional projected displacement by dividing a product of the inverse angle and a position of a supplementary sample by a value used for each of the at least two different precisions
*2204*

Calculating the supplementary sample based on an integer part of the fractional projected displacement
*2206*

Figure 23:
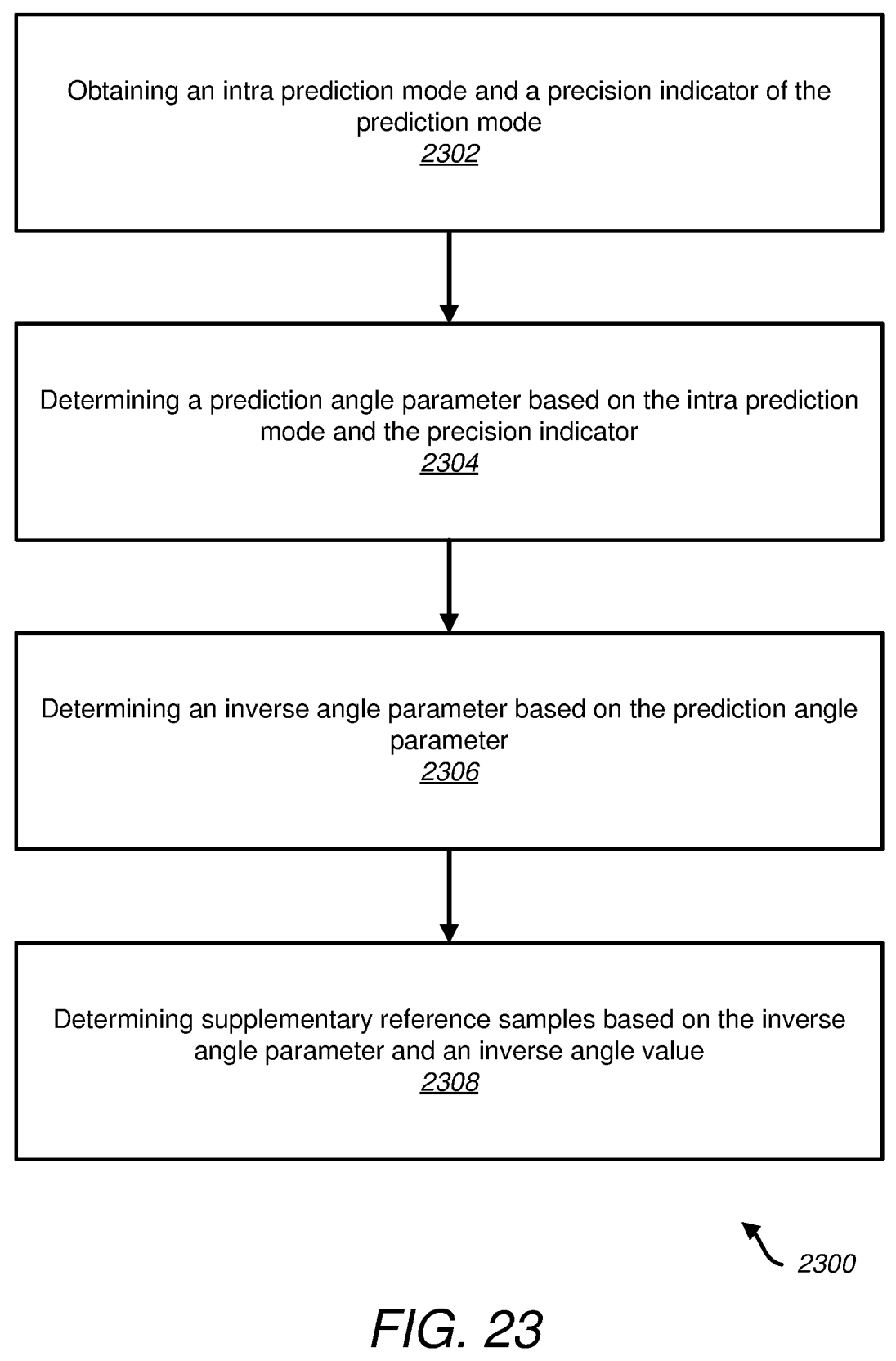

Obtaining an intra prediction mode and a precision indicator of the prediction mode
*2302*

Determining a prediction angle parameter based on the intra prediction mode and the precision indicator
*2304*

Determining an inverse angle parameter based on the prediction angle parameter
*2306*

Determining supplementary reference samples based on the inverse angle parameter and an inverse angle value
*2308*

INTRA PREDICTION WITH MULTIPLE PRECISION OF ANGULAR PARAMETERS

CROSS-REFERENCE TO RELATED APPLICATIONS

This application is a continuation of International Application No. PCT/US2022/045267, filed Sep. 29, 2022, which claims the benefit of U.S. Provisional Application No. 63/250,150, filed Sep. 29, 2021, all of which are hereby incorporated by reference in their entireties.

BRIEF DESCRIPTION OF THE DRAWINGS

Examples of several of the various embodiments of the present disclosure are described herein with reference to the drawings.

FIG. 16 illustrates an example of IBC applied for screen content in accordance with embodiments of the present disclosure.

FIG. 22 illustrates a flowchart of a method for determining a fractional projected displacement for an inverse angle by dividing a product, of the inverse angle and a position of a position of a supplementary sample, by a value used for each of at least two different precisions in accordance with embodiments of the present disclosure.

FIG. 23 illustrates a flowchart of a method for determining an inverse angle parameter based on a prediction angle parameter and determining supplementary reference samples based on the inverse angle parameter and an inverse angle value in accordance with embodiments of the present disclosure.

DETAILED DESCRIPTION

Figure 1:
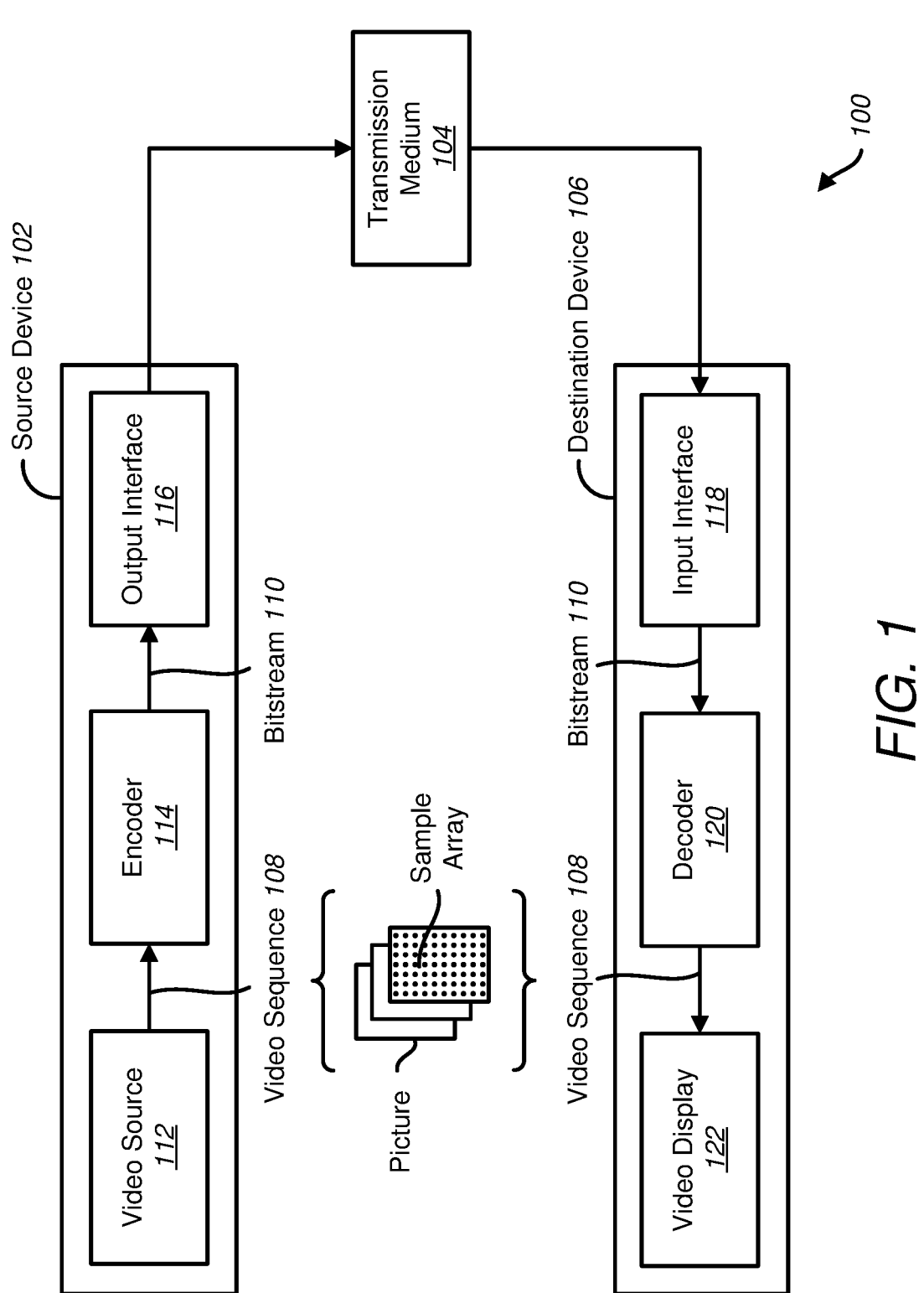
FIG. 1 illustrates an exemplary video coding/decoding system in which embodiments of the present disclosure may be implemented.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Representing a video sequence in digital form may require a large number of bits. The data size of a video sequence in digital form may be too large for storage and/or transmission in many applications. Video encoding may be used to compress the size of a video sequence to provide for more efficient storage and/or transmission. Video decoding may be used to decompress a compressed video sequence for display and/or other forms of consumption.

FIG. 1 illustrates an exemplary video coding/decoding system 100 in which embodiments of the present disclosure may be implemented. Video coding/decoding system 100 comprises a source device 102, a transmission medium 104, and a destination device 106. Source device 102 encodes a video sequence 108 into a bitstream 110 for more efficient storage and/or transmission. Source device 102 may store and/or transmit bitstream 110 to destination device 106 via transmission medium 104. Destination device 106 decodes bitstream 110 to display video sequence 108. Destination device 106 may receive bitstream 110 from source device 102 via transmission medium 104. Source device 102 and destination device 106 may be any one of a number of different devices, including a desktop computer, laptop computer, tablet computer, smart phone, wearable device, television, camera, video gaming console, set-top box, or video streaming device.

To encode video sequence 108 into bitstream 110, source device 102 may comprise a video source 112, an encoder 114, and an output interface 116. Video source 112 may provide or generate video sequence 108 from a capture of a natural scene and/or a synthetically generated scene. A synthetically generated scene may be a scene comprising computer generated graphics or screen content. Video source 112 may comprise a video capture device (e.g., a video camera), a video archive comprising previously captured natural scenes and/or synthetically generated scenes, a video feed interface to receive captured natural scenes and/or synthetically generated scenes from a video content provider, and/or a processor to generate synthetic scenes.

A shown in FIG. 1, a video sequence, such as video sequence 108, may comprise a series of pictures (also referred to as frames). A video sequence may achieve the impression of motion when a constant or variable time is used to successively present pictures of the video sequence. A picture may comprise one or more sample arrays of intensity values. The intensity values may be taken at a series of regularly spaced locations within a picture. A color picture typically comprises a luminance sample array and two chrominance sample arrays. The luminance sample array may comprise intensity values representing the brightness (or luma component, Y) of a picture. The chrominance sample arrays may comprise intensity values that respectively represent the blue and red components of a picture (or chroma components, Cb and Cr) separate from the brightness. Other color picture sample arrays are possible based on different color schemes (e.g., an RGB color scheme). For color pictures, a pixel may refer to all three intensity values for a given location in the three sample arrays used to represent color pictures. A monochrome picture comprises a single, luminance sample array. For monochrome pictures, a pixel may refer to the intensity value at a given location in the single, luminance sample array used to represent monochrome pictures.

Encoder 114 may encode video sequence 108 into bitstream 110. To encode video sequence 108, encoder 114 may apply one or more prediction techniques to reduce redundant information in video sequence 108. Redundant information is information that may be predicted at a decoder and therefore may not be needed to be transmitted to the decoder for accurate decoding of the video sequence. For example, encoder 114 may apply spatial prediction (e.g., intra-frame or intra prediction), temporal prediction (e.g., inter-frame prediction or inter prediction), inter-layer prediction, and/or other prediction techniques to reduce redundant information in video sequence 108. Before applying the one or more prediction techniques, encoder 114 may partition pictures of video sequence 108 into rectangular regions referred to as blocks. Encoder 114 may then encode a block using one or more of the prediction techniques.

For temporal prediction, encoder 114 may search for a block similar to the block being encoded in another picture (also referred to as a reference picture) of video sequence 108. The block determined during the search (also referred to as a prediction block) may then be used to predict the block being encoded. For spatial prediction, encoder 114 may form a prediction block based on data from reconstructed neighboring samples of the block to be encoded within the same picture of video sequence 108. A reconstructed sample refers to a sample that was encoded and then decoded. Encoder 114 may determine a prediction error (also referred to as a residual) based on the difference between a block being encoded and a prediction block. The prediction error may represent non-redundant information that may be transmitted to a decoder for accurate decoding of a video sequence.

Encoder 114 may apply a transform to the prediction error (e.g. a discrete cosine transform (DCT)) to generate transform coefficients. Encoder 114 may form bitstream 110 based on the transform coefficients and other information used to determine prediction blocks (e.g., prediction types, motion vectors, and prediction modes). In some examples, encoder 114 may perform one or more of quantization and entropy coding of the transform coefficients and/or the other information used to determine prediction blocks before forming bitstream 110 to further reduce the number of bits needed to store and/or transmit video sequence 108.

Output interface 116 may be configured to write and/or store bitstream 110 onto transmission medium 104 for transmission to destination device 106. In addition or alternatively, output interface 116 may be configured to transmit, upload, and/or stream bitstream 110 to destination device 106 via transmission medium 104. Output interface 116 may comprise a wired and/or wireless transmitter configured to transmit, upload, and/or stream bitstream 110 according to one or more proprietary and/or standardized communication protocols, such as Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, 3rd Generation Partnership Project (3GPP) standards, Institute of Electrical and Electronics Engineers (IEEE) standards, Internet Protocol (IP) standards, and Wireless Application Protocol (WAP) standards.

Transmission medium 104 may comprise a wireless, wired, and/or computer readable medium. For example, transmission medium 104 may comprise one or more wires, cables, air interfaces, optical discs, flash memory, and/or magnetic memory. In addition or alternatively, transmission medium 104 may comprise one more networks (e.g., the Internet) or file servers configured to store and/or transmit encoded video data.

To decode bitstream 110 into video sequence 108 for display, destination device 106 may comprise an input interface 118, a decoder 120, and a video display 122. Input interface 118 may be configured to read bitstream 110 stored on transmission medium 104 by source device 102. In addition or alternatively, input interface 118 may be configured to receive, download, and/or stream bitstream 110 from source device 102 via transmission medium 104. Input interface 118 may comprise a wired and/or wireless receiver configured to receive, download, and/or stream bitstream 110 according to one or more proprietary and/or standardized communication protocols, such as those mentioned above.

Decoder 120 may decode video sequence 108 from encoded bitstream 110. To decode video sequence 108, decoder 120 may generate prediction blocks for pictures of video sequence 108 in a similar manner as encoder 114 and determine prediction errors for the blocks. Decoder 120 may generate the prediction blocks using prediction types, prediction modes, and/or motion vectors received in bitstream 110 and determine the prediction errors using transform coefficients also received in bitstream 110. Decoder 120 may determine the prediction errors by weighting transform basis functions using the transform coefficients. Decoder 120 may combine the prediction blocks and prediction errors to decode video sequence 108. In some examples, decoder 120 may decode a video sequence that approximates video sequence 108 due to, for example, lossy compression of video sequence 108 by encoder 114 and/or errors introduced into encoded bitstream 110 during transmission to destination device 106.

Video display 122 may display video sequence 108 to a user. Video display 122 may comprise a cathode rate tube (CRT) display, liquid crystal display (LCD), a plasma display, light emitting diode (LED) display, or any other display device suitable for displaying video sequence 108.

It should be noted that video encoding/decoding system 100 is presented by way of example and not limitation. In the example of FIG. 1, video encoding/decoding system 100 may have other components and/or arrangements. For example, video source 112 may be external to source device 102. Similarly, video display 122 may be external to destination device 106 or omitted altogether where video sequence is intended for consumption by a machine and/or storage device. In another example, source device 102 may further comprise a video decoder and destination device 106 may comprise a video encoder. In such an example, source device 102 may be configured to further receive an encoded bit stream from destination device 106 to support two-way video transmission between the devices.

In the example of FIG. 1, encoder 114 and decoder 120 may operate according to any one of a number of proprietary or industry video coding standards. For example, encoder 114 and decoder 120 may operate according to one or more of International Telecommunications Union Telecommunication Standardization Sector (ITU-T) H.263, ITU-T H.264 and Moving Picture Expert Group (MPEG)-4 Visual (also known as Advanced Video Coding (AVC), ITU-T H.265 and MPEG-H Part 2 (also known as High Efficiency Video Coding (HEVC), ITU-T H.265 and MPEG-I Part 3 (also known as Versatile Video Coding (VVC)), the WebM VP8 and VP9 codecs, and AOMedia Video 1 (AV1).

Figure 2:
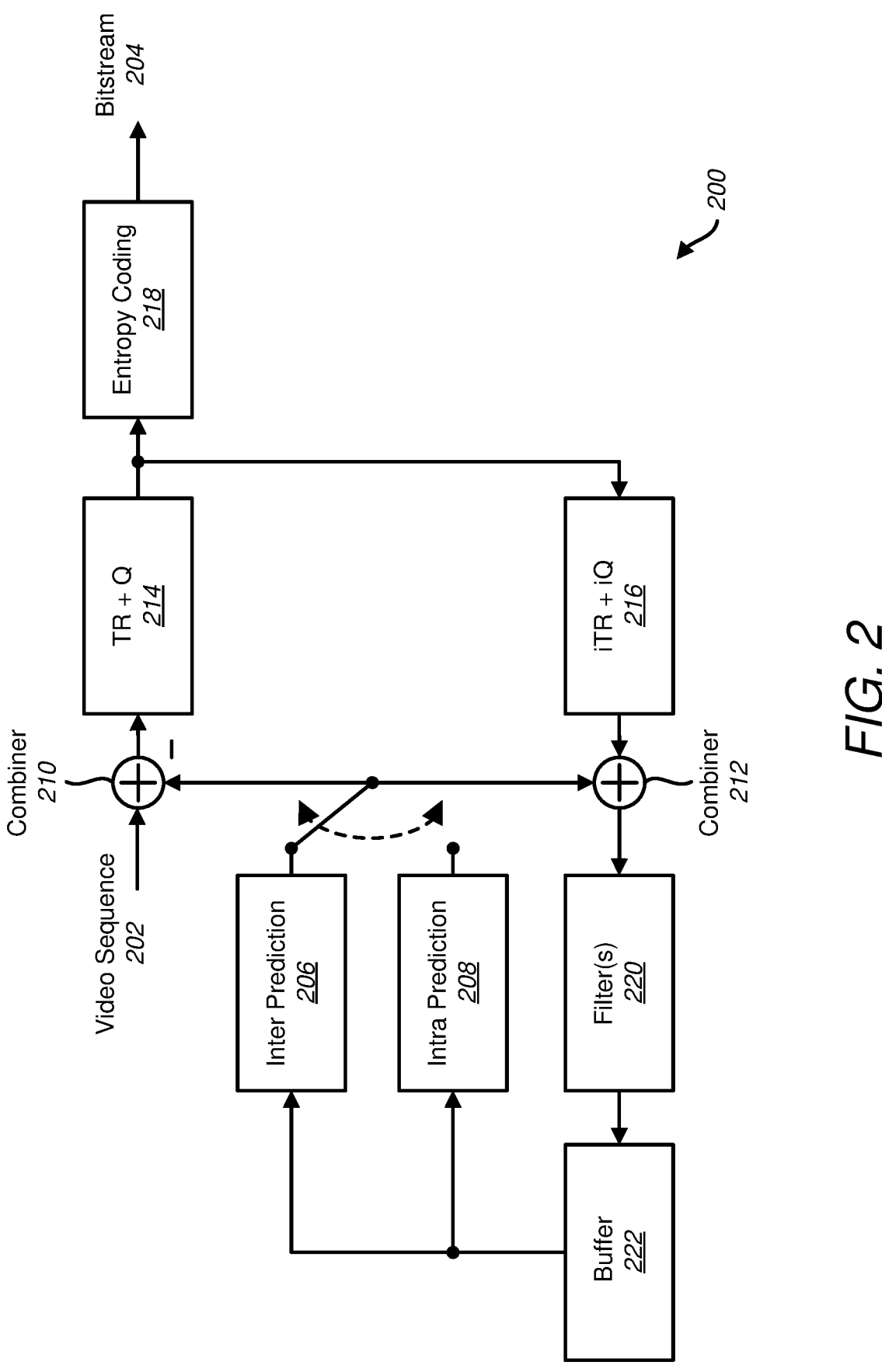
FIG. 2 illustrates an exemplary encoder in which embodiments of the present disclosure may be implemented.

FIG. 2 illustrates an exemplary encoder 200 in which embodiments of the present disclosure may be implemented. Encoder 200 encodes a video sequence 202 into a bitstream 204 for more efficient storage and/or transmission. Encoder 200 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Encoder 200 comprises an inter prediction unit 206, an intra prediction unit 208, combiners 210 and 212, a transform and quantization unit (TR+Q) unit 214, an inverse transform and quantization unit (iTR+iQ) 216, entropy coding unit 218, one or more filters 220, and a buffer 222.

Encoder 200 may partition the pictures of video sequence 202 into blocks and encode video sequence 202 on a block-by-block basis. Encoder 200 may perform a prediction technique on a block being encoded using either inter prediction unit 206 or intra prediction unit 208. Inter prediction unit 206 may perform inter prediction by searching for a block similar to the block being encoded in another, reconstructed picture (also referred to as a reference picture) of video sequence 202. A reconstructed picture refers to a picture that was encoded and then decoded. The block determined during the search (also referred to as a prediction block) may then be used to predict the block being encoded to remove redundant information. Inter prediction unit 206 may exploit temporal redundancy or similarities in scene content from picture to picture in video sequence 202 to determine the prediction block. For example, scene content between pictures of video sequence 202 may be similar except for differences due to motion or affine transformation of the screen content over time.

Intra prediction unit 208 may perform intra prediction by forming a prediction block based on data from reconstructed neighboring samples of the block to be encoded within the same picture of video sequence 202. A reconstructed sample refers to a sample that was encoded and then decoded. Intra prediction unit 208 may exploit spatial redundancy or similarities in scene content within a picture of video sequence 202 to determine the prediction block. For example, the texture of a region of scene content in a picture may be similar to the texture in the immediate surrounding area of the region of the scene content in the same picture.

After prediction, combiner 210 may determine a prediction error (also referred to as a residual) based on the difference between the block being encoded and the prediction block. The prediction error may represent non-redundant information that may be transmitted to a decoder for accurate decoding of a video sequence.

Transform and quantization unit 214 may transform and quantize the prediction error. Transform and quantization unit 214 may transform the prediction error into transform coefficients by applying, for example, a DCT to reduce correlated information in the prediction error. Transform and quantization unit 214 may quantize the coefficients by mapping data of the transform coefficients to a predefined set of representative values. Transform and quantization unit 214 may quantize the coefficients to reduce irrelevant information in bitstream 204. Irrelevant information is information that may be removed from the coefficients without producing visible and/or perceptible distortion in video sequence 202 after decoding.

Entropy coding unit 218 may apply one or more entropy coding methods to the quantized transform coefficients to further reduce the bit rate. For example, entropy coding unit 218 may apply context adaptive variable length coding (CAVLC), context adaptive binary arithmetic coding (CABAC), and syntax-based context-based binary arithmetic coding (SBAC). The entropy coded coefficients are packed to form bitstream 204.

Inverse transform and quantization unit 216 may inverse quantize and inverse transform the quantized transform coefficients to determine a reconstructed prediction error. Combiner 212 may combine the reconstructed prediction error with the prediction block to form a reconstructed block. Filter(s) 220 may filter the reconstructed block using, for example, a deblocking filter and/or a sample-adaptive offset (SAO) filter. Buffer 222 may store the reconstructed block for prediction of one or more other blocks in the same and/or different picture of video sequence 202.

Although not shown in FIG. 2, encoder 200 further comprises an encoder control unit configured to control one or more of the units of encoder 200 shown in FIG. 2. The encoder control unit may control the one or more units of encoder 200 such that bitstream 204 is generated in conformance with the requirements of any one of a number of proprietary or industry video coding standards. For example, The encoder control unit may control the one or more units of encoder 200 such that bitstream 204 is generated in conformance with one or more of ITU-T H.263, AVC, HEVC, VVC, VP8, VP9, and AV1 video coding standards.

Within the constraints of a proprietary or industry video coding standard, the encoder control unit may attempt to minimize or reduce the bitrate of bitstream 204 and maximize or increase the reconstructed video quality. For example, the encoder control unit may attempt to minimize or reduce the bitrate of bitstream 204 given a level that the reconstructed video quality may not fall below, or attempt to maximize or increase the reconstructed video quality given a level that the bit rate of bitstream 204 may not exceed. The encoder control unit may determine/control one or more of: partitioning of the pictures of video sequence 202 into blocks, whether a block is inter predicted by inter prediction unit 206 or intra predicted by intra prediction unit 208, a motion vector for inter prediction of a block, an intra prediction mode among a plurality of intra prediction modes for intra prediction of a block, filtering performed by filter(s) 220, and one or more transform types and/or quantization parameters applied by transform and quantization unit 214. The encoder control unit may determine/control the above based on how the determination/control effects a rate-distortion measure for a block or picture being encoded. The encoder control unit may determine/control the above to reduce the rate-distortion measure for a block or picture being encoded.

After being determined, the prediction type used to encode a block (intra or inter prediction), prediction information of the block (intra prediction mode if intra predicted, motion vector, etc.), and transform and quantization parameters, may be sent to entropy coding unit 218 to be further compressed to reduce the bit rate. The prediction type, prediction information, and transform and quantization parameters may be packed with the prediction error to form bitstream 204.

It should be noted that encoder 200 is presented by way of example and not limitation. In other examples, encoder 200 may have other components and/or arrangements. For example, one or more of the components shown in FIG. 2 may be optionally included in encoder 200, such as entropy coding unit 218 and filters(s) 220.

Figure 3:
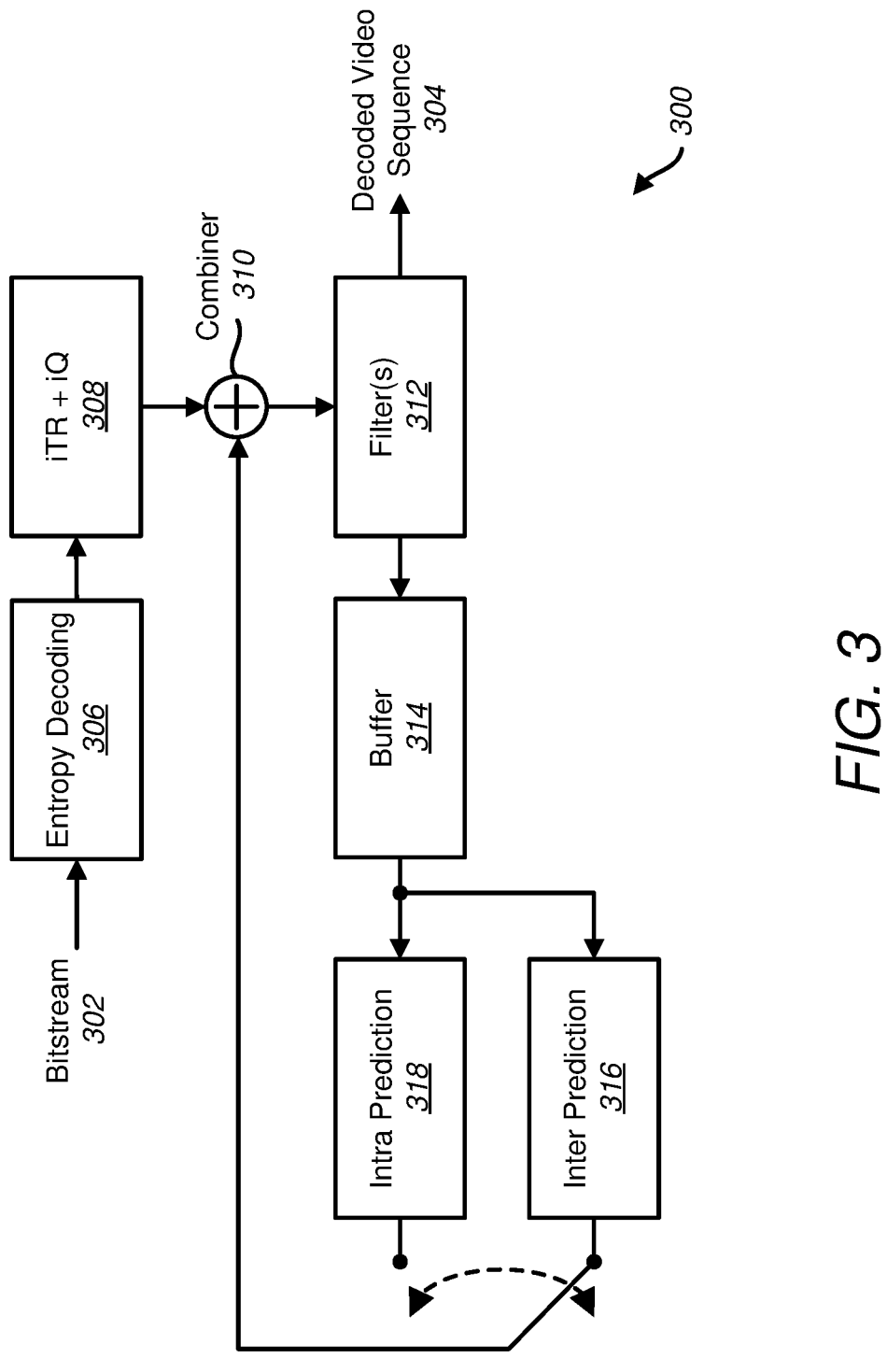
FIG. 3 illustrates an exemplary decoder in which embodiments of the present disclosure may be implemented.

FIG. 3 illustrates an exemplary decoder 300 in which embodiments of the present disclosure may be implemented. Decoder 300 decodes an bitstream 302 into a decoded video sequence for display and/or some other form of consumption. Decoder 300 may be implemented in video coding/decoding system 100 in FIG. 1 or in any one of a number of different devices, including a desktop computer, laptop computer, tablet computer, smart phone, wearable device, television, camera, video gaming console, set-top box, or video streaming device. Decoder 300 comprises an entropy decoding unit 306, an inverse transform and quantization (iTR+iQ) unit 308, a combiner 310, one or more filters 312, a buffer 314, an inter prediction unit 316, and an intra prediction unit 318.

Although not shown in FIG. 3, decoder 300 further comprises a decoder control unit configured to control one or more of the units of decoder 300 shown in FIG. 3. The decoder control unit may control the one or more units of decoder 300 such that bitstream 302 is decoded in conformance with the requirements of any one of a number of proprietary or industry video coding standards. For example, The decoder control unit may control the one or more units of decoder 300 such that bitstream 302 is decoded in conformance with one or more of ITU-T H.263, AVC, HEVC, VVC, VP8, VP9, and AV1 video coding standards.

The decoder control unit may determine/control one or more of: whether a block is inter predicted by inter prediction unit 316 or intra predicted by intra prediction unit 318, a motion vector for inter prediction of a block, an intra prediction mode among a plurality of intra prediction modes for intra prediction of a block, filtering performed by filter(s) 312, and one or more inverse transform types and/or inverse quantization parameters to be applied by inverse transform and quantization unit 308. One or more of the control parameters used by the decoder control unit may be packed in bitstream 302.

Entropy decoding unit 306 may entropy decode the bitstream 302. Inverse transform and quantization unit 308 may inverse quantize and inverse transform the quantized transform coefficients to determine a decoded prediction error. Combiner 310 may combine the decoded prediction error with a prediction block to form a decoded block. The prediction block may be generated by inter prediction unit 318 or inter prediction unit 316 as described above with respect to encoder 200 in FIG. 2. Filter(s) 312 may filter the decoded block using, for example, a deblocking filter and/or a sample-adaptive offset (SAO) filter. Buffer 314 may store the decoded block for prediction of one or more other blocks in the same and/or different picture of the video sequence in bitstream 302. Decoded video sequence 304 may be output from filter(s) 312 as shown in FIG. 3.

It should be noted that decoder 300 is presented by way of example and not limitation. In other examples, decoder 300 may have other components and/or arrangements. For example, one or more of the components shown in FIG. 3 may be optionally included in decoder 300, such as entropy decoding unit 306 and filters(s) 312.

It should be further noted that, although not shown in FIGS. 2 and 3, each of encoder 200 and decoder 300 may further comprise an intra block copy unit in addition to inter prediction and intra prediction units. The intra block copy unit may perform similar to an inter prediction unit but predict blocks within the same picture. For example, the intra block copy unit may exploit repeated patterns that appear in screen content. Screen content may include, for example, computer generated text, graphics, and animation.

As mentioned above, video encoding and decoding may be performed on a block-by-block basis. The process of partitioning a picture into blocks may be adaptive based on the content of the picture. For example, larger block partitions may be used in areas of a picture with higher levels of homogeneity to improve coding efficiency.

In HEVC, a picture may be partitioned into non-overlapping square blocks, referred to as coding tree blocks (CTBs), comprising samples of a sample array. A CTB may have a size of $2^n \times 2^n$ samples, where n may be specified by a parameter of the encoding system. For example, n may be 4, 5, or 6. A CTB may be further partitioned by a recursive quadtree partitioning into coding blocks (CBs) of half vertical and half horizontal size. The CTB forms the root of the quadtree. A CB that is not split further as part of the recursive quadtree partitioning may be referred to as a leaf-CB of the quadtree and otherwise as a non-leaf CB of the quadtree. A CB may have a minimum size specified by a parameter of the encoding system. For example, a CB may have a minimum size of 4×4, 8×8, 16×16, 32×32, or 64×64 samples. For inter and intra prediction, a CB may be further partitioned into one or more prediction blocks (PBs) for performing inter and intra prediction. A PB may be a rectangular block of samples on which the same prediction type/mode may be applied. For transformations, a CB may be partitioned into one or more transform blocks (TBs). A TB may be a rectangular block of samples that may determine an applied transform size.

Figure 4:
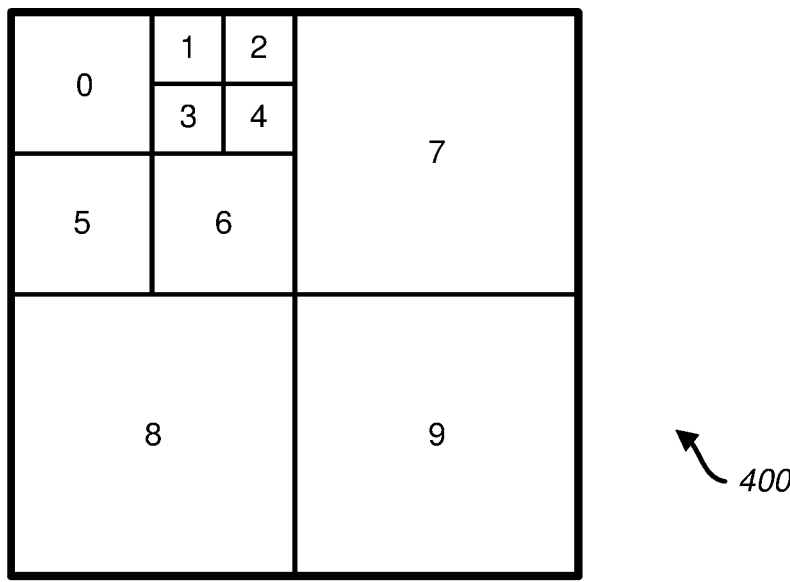
FIG. 4 illustrates an example quadtree partitioning of a coding tree block (CTB) in accordance with embodiments of the present disclosure.
Figure 5:
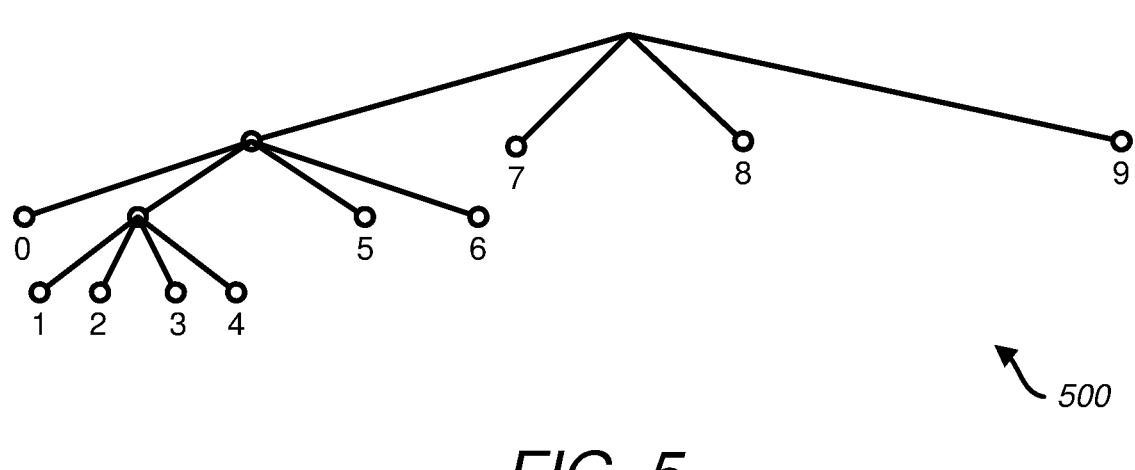
FIG. 5 illustrates a corresponding quadtree of the example quadtree partitioning of the CTB in FIG. 4 in accordance with embodiments of the present disclosure.

FIG. 4 illustrates an example quadtree partitioning of a CTB 400. FIG. 5 illustrates a corresponding quadtree 500 of the example quadtree partitioning of CTB 400 in FIG. 4. As shown in FIGS. 4 and 5, CTB 400 is first partitioned into four CBs of half vertical and half horizontal size. Three of the resulting CBs of the first level partitioning of CTB 400 are leaf-CBs. The three leaf CBs of the first level partitioning of CTB 400 are respectively labeled 7, 8, and 9 in FIGS. 4 and 5. The non-leaf CB of the first level partitioning of CTB 400 is partitioned into four sub-CBs of half vertical and half horizontal size. Three of the resulting sub-CBs of the second level partitioning of CTB 400 are leaf CBs. The three leaf CBs of the second level partitioning of CTB 400 are respectively labeled 0, 5, and 6 in FIGS. 4 and 5. Finally, the non-leaf CB of the second level partitioning of CTB 400 is partitioned into four leaf CBs of half vertical and half horizontal size. The four leaf CBs are respectively labeled 1, 2, 3, and 4 in FIGS. 4 and 5.

Altogether, CTB 400 is partitioned into 10 leaf CBs respectively labeled 0-9. The resulting quadtree partitioning of CTB 400 may be scanned using a z-scan (left-to-right, top-to-bottom) to form the sequence order for encoding/decoding the CB leaf nodes. The numeric label of each CB leaf node in FIGS. 4 and 5 may correspond to the sequence order for encoding/decoding, with CB leaf node 0 encoded/decoded first and CB leaf node 9 encoded/decoded last. Although not shown in FIGS. 4 and 5, it should be noted that each CB leaf node may comprise one or more PBs and TBs.

Figure 6:
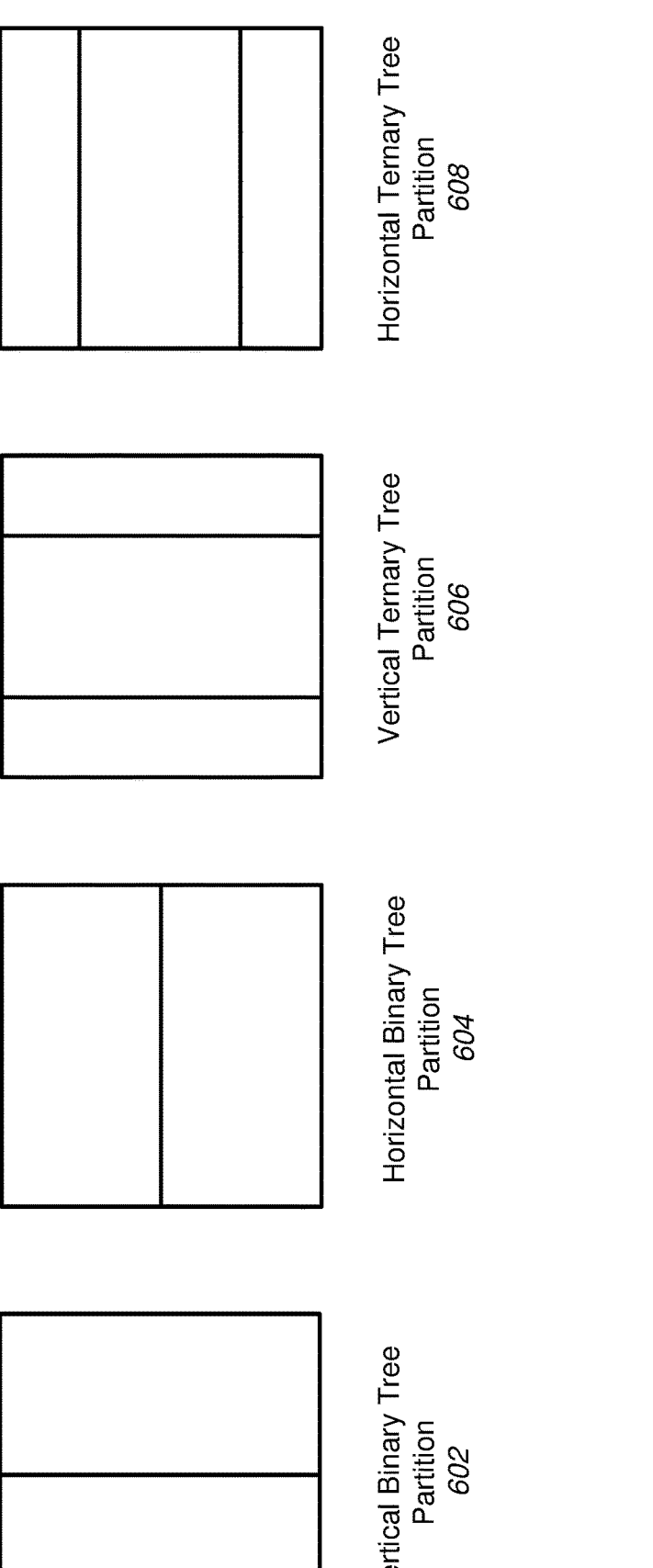
FIG. 6 illustrates example binary and ternary tree partitions in accordance with embodiments of the present disclosure.

In VVC, a picture may be partitioned in a similar manner as in HEVC. A picture may be first partitioned into non-overlapping square CTBs. The CTBs may then be partitioned by a recursive quadtree partitioning into CBs of half vertical and half horizontal size. In VVC, a quadtree leaf node may be further partitioned by a binary tree or ternary tree partitioning into CBs of unequal sizes. FIG. 6 illustrates example binary and ternary tree partitions. A binary tree partition may divide a parent block in half in either the vertical direction 602 or horizontal direction 604. The resulting partitions may be half in size as compared to the parent block. A ternary tree partition may divide a parent block into three parts in either the vertical direction 606 or horizontal direction 608. The middle partition may be twice as large as the other two end partitions in a ternary tree partition.

Figure 7:
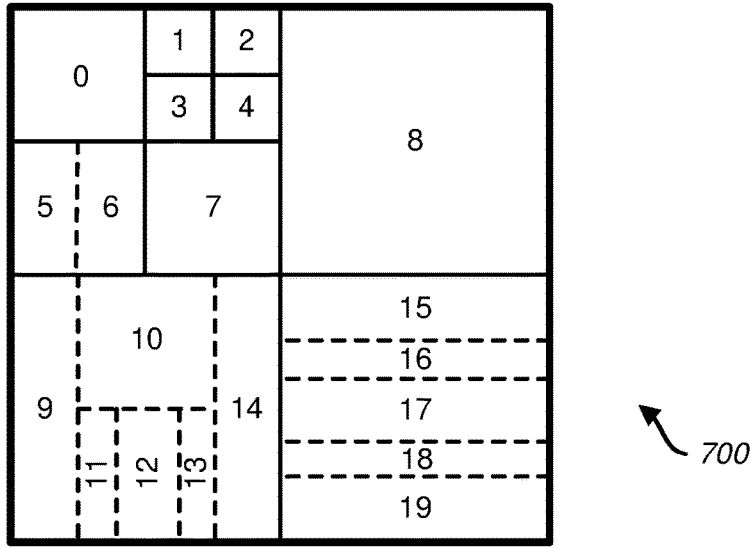
FIG. 7 illustrates an example quadtree+multi-type tree partitioning of a CTB in accordance with embodiments of the present disclosure.
Figure 8:
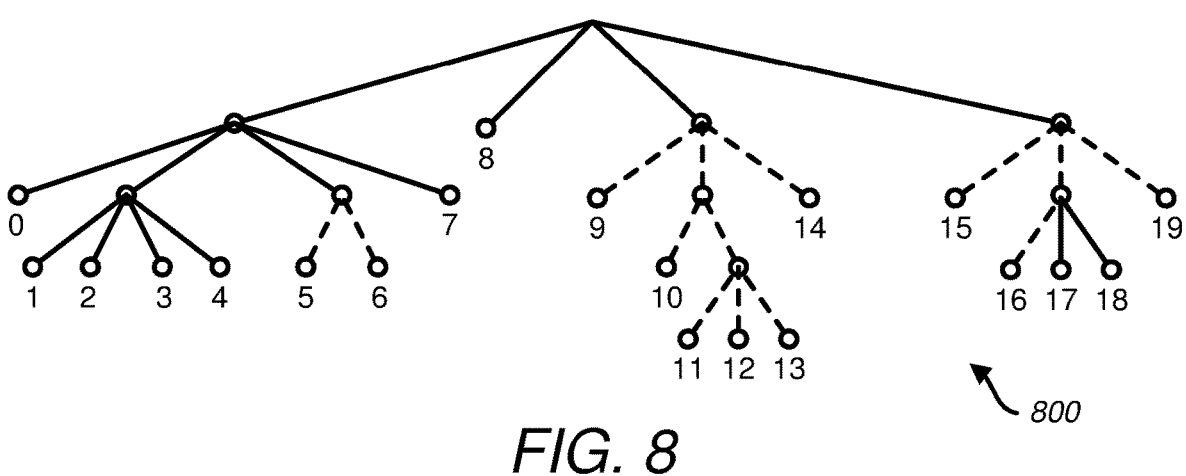
FIG. 8 illustrates a corresponding quadtree+multi-type tree of the example quadtree+multi-type tree partitioning of the CTB in FIG. 7 in accordance with embodiments of the present disclosure.

Because of the addition of binary and ternary tree partitioning, in VVC the block partitioning strategy may be referred to as quadtree+multi-type tree partitioning. FIG. 7 illustrates an example quadtree+multi-type tree partitioning of a CTB 700. FIG. 8 illustrates a corresponding quadtree+multi-type tree 800 of the example quadtree+multi-type tree partitioning of CTB 700 in FIG. 7. In both FIGS. 7 and 8, quadtree splits are shown in solid lines and multi-type tree splits are shown in dashed lines. For ease of explanation, CTB 700 is shown with the same quadtree partitioning as CTB 400 described in FIG. 4. Therefore, description of the quadtree partitioning of CTB 700 is omitted. The description of the additional multi-type tree partitions of CTB 700 is made relative to three leaf-CBs shown in FIG. 4 that have been further partitioned using one or more binary and ternary tree partitions. The three leaf-CBs in FIG. 4 that are shown in FIG. 7 as being further partitioned are leaf-CBs 5, 8, and 9.

Starting with leaf-CB 5 in FIG. 4, FIG. 7 shows this leaf-CB partitioned into two CBs based on a vertical binary tree partitioning. The two resulting CBs are leaf-CBs respectively labeled 5 and 6 in FIGS. 7 and 8. With respect to leaf-CB 8 in FIG. 4, FIG. 7 shows this leaf-CB partitioned into three CBs based on a vertical ternary tree partition. Two of the three resulting CBs are leaf-CBs respectively labeled 9 and 14 in FIGS. 7 and 8. The remaining, non-leaf CB is partitioned first into two CBs based on a horizontal binary tree partition, one of which is a leaf-CB labeled 10 and the other of which is further partitioned into three CBs based on a vertical ternary tree partition. The resulting three CBs are leaf-CBs respectively labeled 11, 12, and 13 in FIGS. 7 and 8. Finally, with respect to leaf-CB 9 in FIG. 4, FIG. 7 shows this leaf-CB partitioned into three CBs based on a horizontal ternary tree partition. Two of the three CBs are leaf-CBs respectively labeled 15 and 19 in FIGS. 7 and 8. The remaining, non-leaf CB is partitioned into three CBs based on another horizontal ternary tree partition. The resulting three CBs are all leaf-CBs respectively labeled 16, 17, and 18 in FIGS. 7 and 8.

Altogether, CTB 700 is partitioned into 20 leaf CBs respectively labeled 0-19. The resulting quadtree+multi-type tree partitioning of CTB 700 may be scanned using a z-scan (left-to-right, top-to-bottom) to form the sequence order for encoding/decoding the CB leaf nodes. The numeric label of each CB leaf node in FIGS. 7 and 8 may correspond to the sequence order for encoding/decoding, with CB leaf node 0 encoded/decoded first and CB leaf node 19 encoded/decoded last. Although not shown in FIGS. 7 and 8, it should be noted that each CB leaf node may comprise one or more PBs and TBs.

In addition to specifying various blocks (e.g., CTB, CB, PB, TB), HEVC and VVC further define various units. While blocks may comprise a rectangular area of samples in a sample array, units may comprise the collocated blocks of samples from the different sample arrays (e.g., luma and chroma sample arrays) that form a picture as well as syntax elements and prediction data of the blocks. A coding tree unit (CTU) may comprise the collocated CTBs of the different sample arrays and may form a complete entity in an encoded bit stream. A coding unit (CU) may comprise the collocated CBs of the different sample arrays and syntax structures used to code the samples of the CBs. A prediction unit (PU) may comprise the collocated PBs of the different sample arrays and syntax elements used to predict the PBs. A transform unit (TU) may comprise TBs of the different samples arrays and syntax elements used to transform the TBs.

It should be noted that the term block may be used to refer to any of a CTB, CB, PB, TB, CTU, CU, PU, or TU in the context of HEVC and VVC. It should be further noted that the term block may be used to refer to similar data structures in the context of other video coding standards. For example, the term block may refer to a macroblock in AVC, a macroblock or sub-block in VP8, a superblock or sub-block in VP9, or a superblock or sub-block in AV1.

In intra prediction, samples of a block to be encoded (also referred to as the current block) may be predicted from samples of the column immediately adjacent to the left-most column of the current block and samples of the row immediately adjacent to the top-most row of the current block. The samples from the immediately adjacent column and row may be jointly referred to as reference samples. Each sample of the current block may be predicted by projecting the position of the sample in the current block in a given direction (also referred to as an intra prediction mode) to a point along the reference samples. The sample may be predicted by interpolating between the two closest reference samples of the projection point if the projection does not fall directly on a reference sample. A prediction error (also referred to as a residual) may be determined for the current block based on differences between the predicted sample values and the original sample values of the current block.

At an encoder, this process of predicting samples and determining a prediction error based on a difference between the predicted samples and original samples may be performed for a plurality of different intra prediction modes, including non-directional intra prediction modes. The encoder may select one of the plurality of intra prediction modes and its corresponding prediction error to encode the current block. The encoder may send an indication of the selected prediction mode and its corresponding prediction error to a decoder for decoding of the current block. The decoder may decode the current block by predicting the samples of the current block using the intra prediction mode indicated by the encoder and combining the predicted samples with the prediction error.

Figure 9:
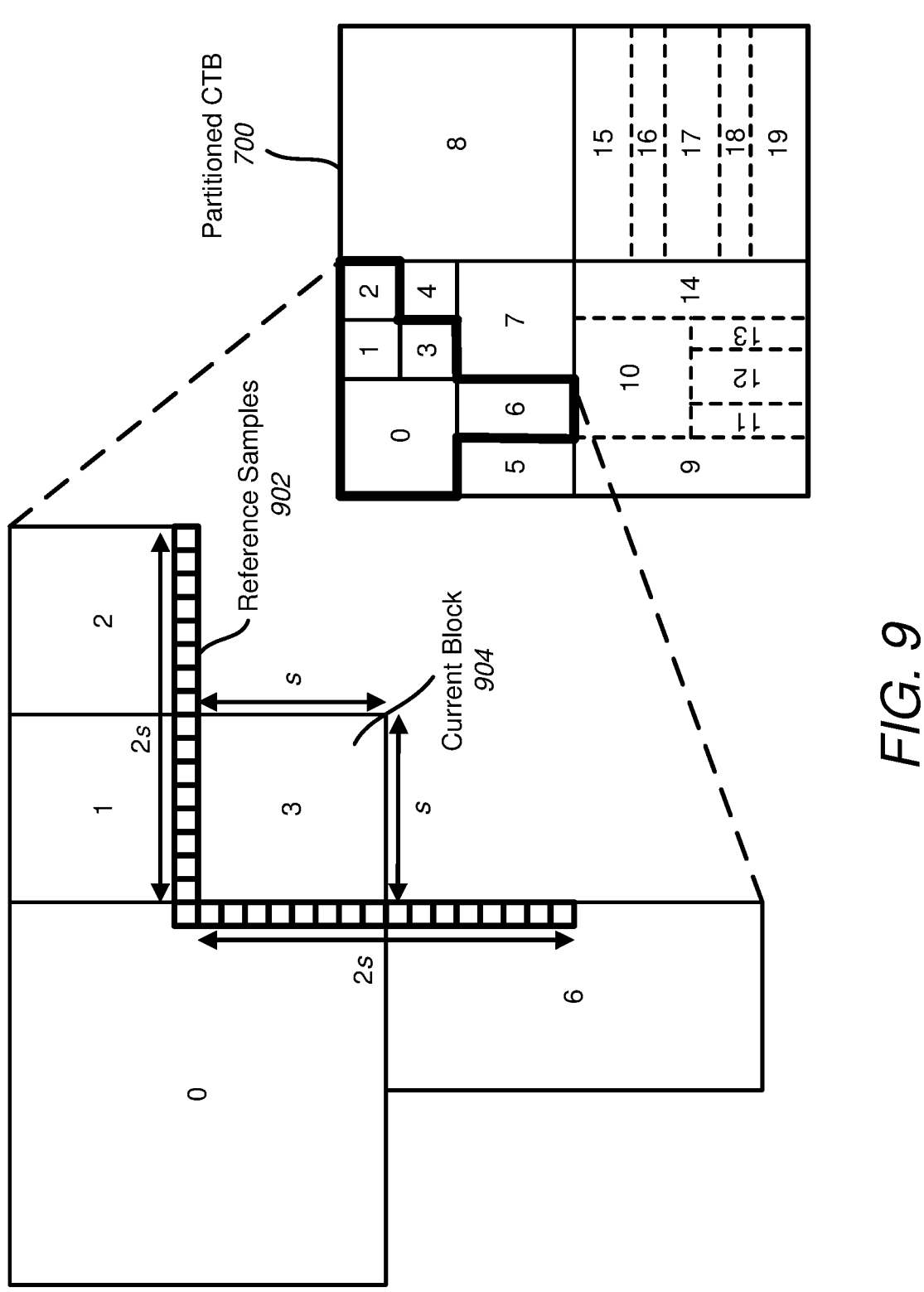
FIG. 9 illustrates an example set of reference samples determined for intra prediction of a current block being encoded or decoded in accordance with embodiments of the present disclosure.

FIG. 9 illustrates an example set of reference samples 902 determined for intra prediction of a current block 904 being encoded or decoded. In FIG. 9, current block 904 corresponds to block 3 of partitioned CTB 700 in FIG. 7. As explained above, the numeric labels 0-19 of the blocks of partitioned CTB 700 may correspond to the sequence order for encoding/decoding the blocks and are used as such in the example of FIG. 9.

Given current block 904 is of w×h samples in size, reference samples 902 may extend over 2w samples of the row immediately adjacent to the top-most row of current block 904, 2h samples of the column immediately adjacent to the left-most column of current block 904, and the top left neighboring corner sample to current block 904. In the example of FIG. 9, current block 904 is square, so w=h=s. For constructing the set of reference samples 902, available samples from neighboring blocks of current block 904 may be used. Samples may not be available for constructing the set of reference samples 902 if, for example, the samples would lie outside the picture of the current block, the samples are part of a different slice of the current block (where the concept of slices are used), and/or the samples belong to blocks that have been inter coded and constrained intra prediction is indicated. When constrained intra prediction is indicated, intra prediction may not be dependent on inter predicted blocks.

In addition to the above, samples that may not be available for constructing the set of reference samples 902 include samples in blocks that have not already been encoded and reconstructed at an encoder or decoded at a decoder based on the sequence order for encoding/decoding. This restriction may allow identical prediction results to be determined at both the encoder and decoder. In FIG. 9, samples from neighboring blocks 0, 1, and 2 may be available to construct reference samples 902 given that these blocks are encoded and reconstructed at an encoder and decoded at a decoder prior to coding of current block 904. This assumes there are no other issues, such as those mentioned above, preventing the availability of samples from neighboring blocks 0, 1, and 2. However, the portion of reference samples 902 from neighboring block 6 may not be available due to the sequence order for encoding/decoding.

Unavailable ones of reference samples 902 may be filled with available ones of reference samples 902. For example, an unavailable reference sample may be filled with a nearest available reference sample determined by moving in a clock-wise direction through reference samples 902 from the position of the unavailable reference. If no reference samples are available, reference samples 902 may be filled with the mid-value of the dynamic range of the picture being coded.

It should be noted that reference samples 902 may be filtered based on the size of current block 904 being coded and an applied intra prediction mode. It should be further noted that FIG. 9 illustrates only one exemplary determination of reference samples for intra prediction of a block. In some proprietary and industry video coding standards, reference samples may be determined in a different manner than discussed above. For example, multiple reference lines may be used in other instances, such as used in VVC.

After reference samples 902 are determined and optionally filtered, samples of current block 904 may be intra predicted based on reference samples 902. Most encoders/decoders support a plurality of intra prediction modes in accordance with one or more video coding standards. For example, HEVC supports 35 intra prediction modes, including a planar mode, a DC mode, and 33 angular modes. VVC supports 67 intra prediction modes, including a planar mode, a DC mode, and 65 angular modes. Planar and DC modes may be used to predict smooth and gradually changing regions of a picture. Angular modes may be used to predict directional structures in regions of a picture.

Figure 10A:
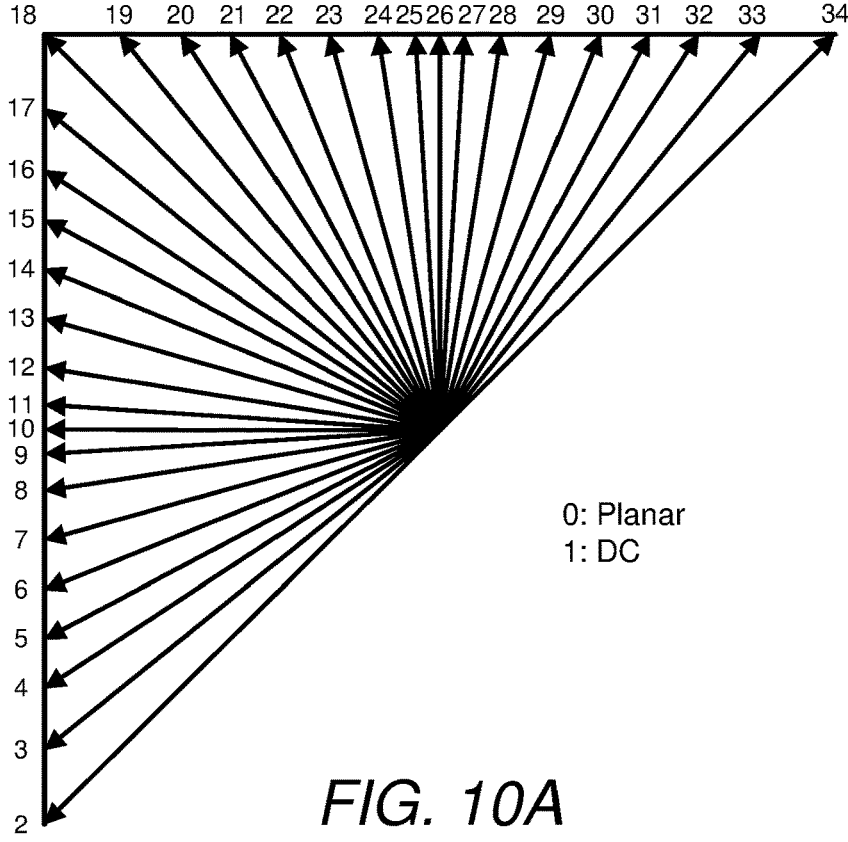
FIG. 10A illustrates the 35 intra prediction modes supported by HEVC in accordance with embodiments of the present disclosure.

FIG. 10A illustrates the 35 intra prediction modes supported by HEVC. The 35 intra prediction modes are identified by indices 0 to 34. Prediction mode 0 corresponds to planar mode. Prediction mode 1 corresponds to DC mode. Prediction modes 2-34 correspond to angular modes. Prediction modes 2-18 may be referred to as horizontal prediction modes because the principal source of prediction is in the horizontal direction. Prediction modes 19-34 may be referred to as vertical prediction modes because the principal source of prediction is in the vertical direction.

Figure 10B:
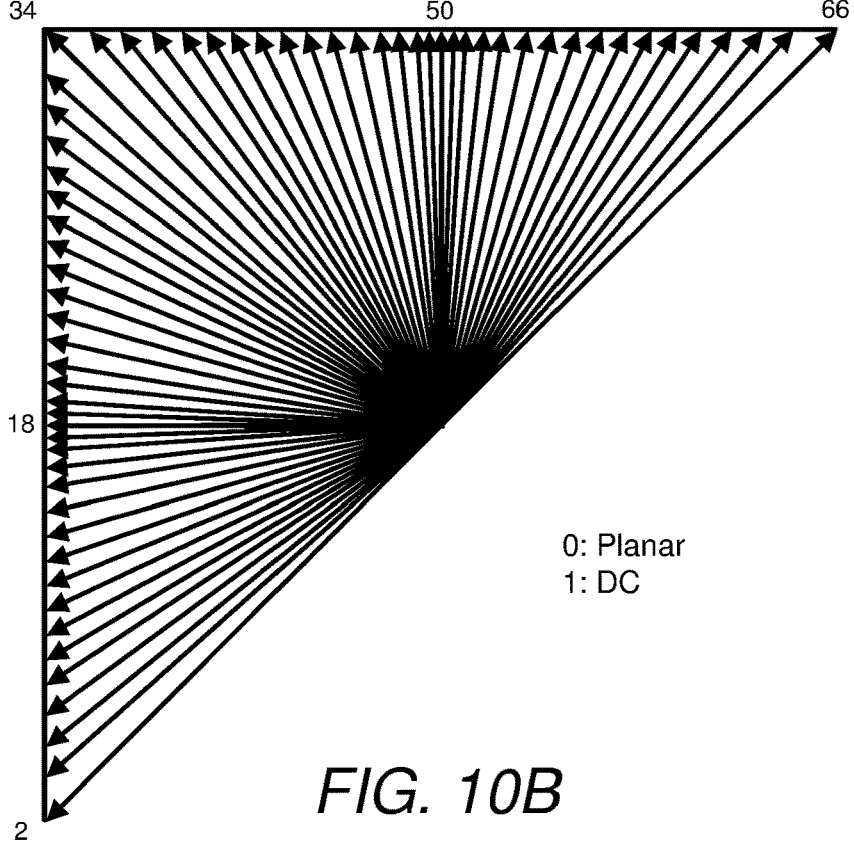
FIG. 10B illustrates the 67 intra prediction modes supported by HEVC in accordance with embodiments of the present disclosure.

FIG. 10B illustrates the 67 intra prediction modes supported by VVC. The 67 intra prediction modes are identified by indices 0 to 66. Prediction mode 0 corresponds to planar mode. Prediction mode 1 corresponds to DC mode. Prediction modes 2-66 correspond to angular modes. Prediction modes 2-34 may be referred to as horizontal prediction modes because the principal source of prediction is in the horizontal direction. Prediction modes 35-66 may be referred to as vertical prediction modes because the principal source of prediction is in the vertical direction. Because blocks in VVC may be non-square, some of the intra prediction modes illustrated in FIG. 10B may be adaptively replaced by wide-angle directions.

Figure 11:
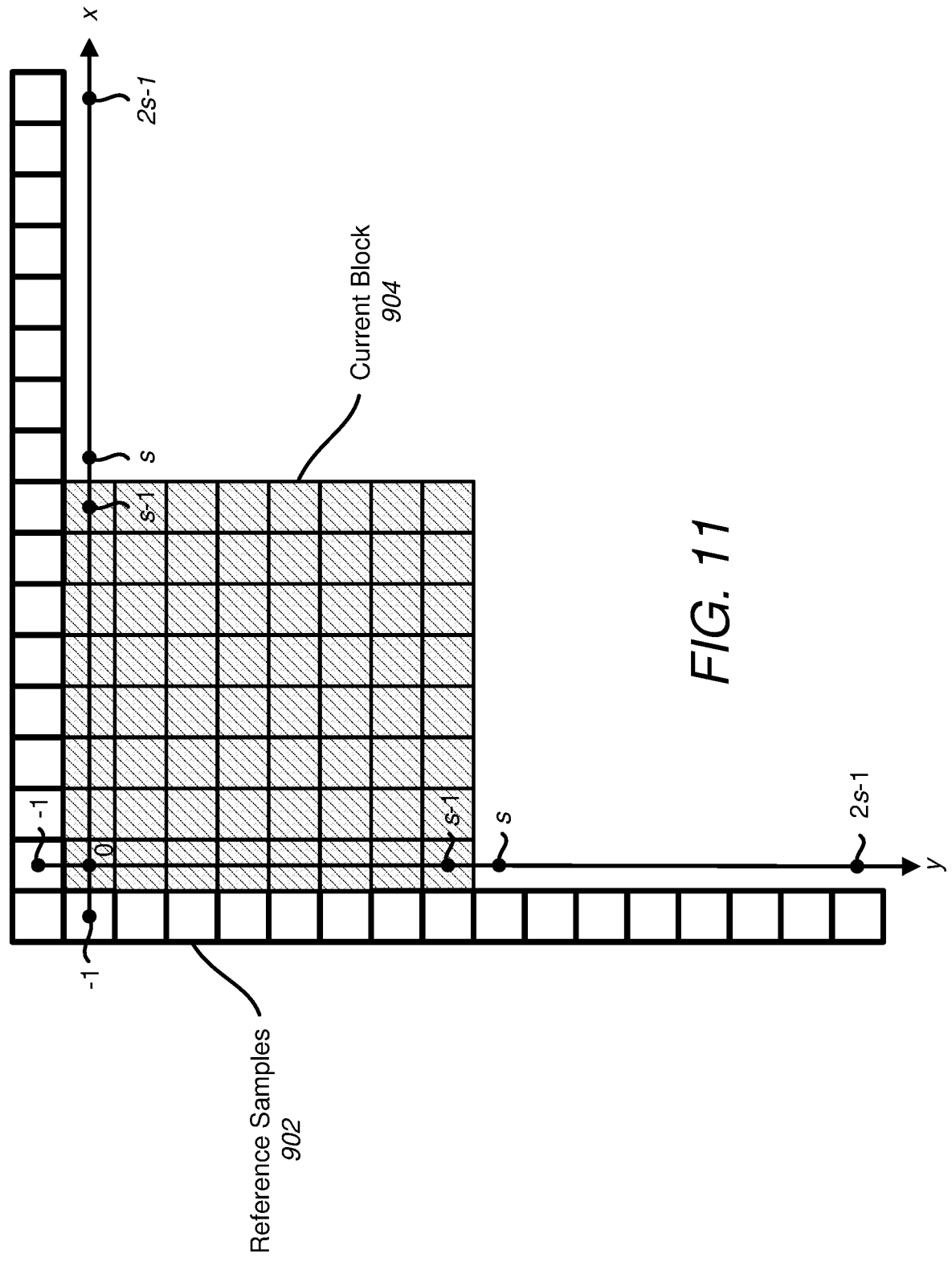
FIG. 11 illustrates the current block and reference samples from FIG. 9 in a two-dimensional x, y plane in accordance with embodiments of the present disclosure.
Figure 12:
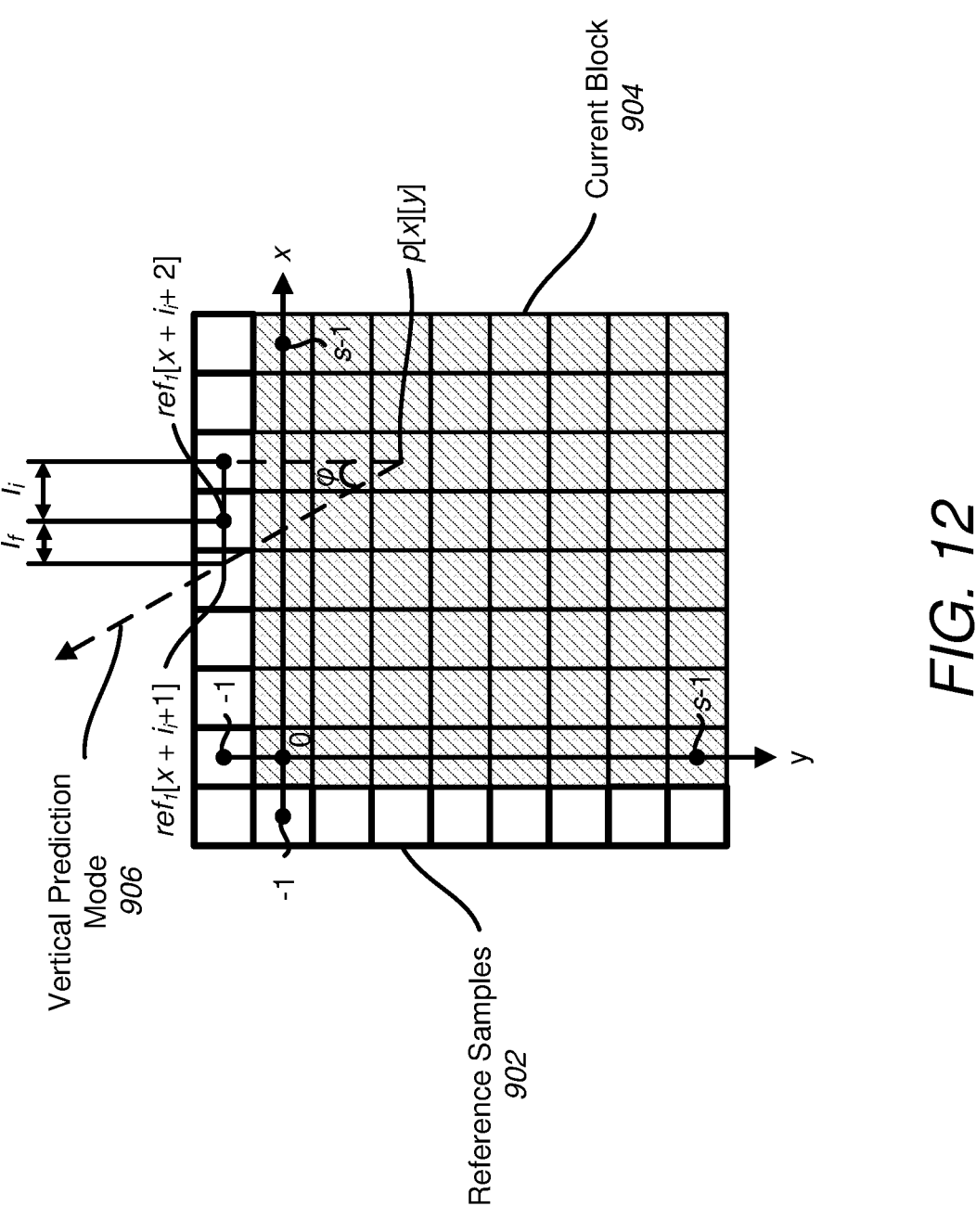
FIG. 12 illustrates an example angular mode prediction of the current block from FIG. 9 in accordance with embodiments of the present disclosure.

To further describe the application of intra prediction modes to determine a prediction of a current block, reference is made to FIGS. 11 and 12. In FIG. 11, current block 904 and reference samples 902 from FIG. 9 are shown in a two-dimensional x, y plane, where a sample may be referenced as p[x][y]. In order to simplify the prediction process, reference samples 902 may be placed in two, one-dimensional arrays. Reference samples 902 above current block 904 may be placed in the one-dimensional array $ref_1[x]$:

$$ref_1[x] = p[-1 + x][-1], \qquad (1)$$

$$(x \geq 0)$$

Reference samples 902 to the left of current block 904 may be placed in the one-dimensional array $ref_2[x]$:

$$ref_2[y] = p[-1][-1 + y], (y \geq 0) \qquad (2)$$

For planar mode, a sample at location [x][y] in current block 904 may be predicted by calculating the mean of two interpolated values. The first of the two interpolated values may be based on a horizontal linear interpolation at location [x][y] in current block 904. The second of the two interpolated values may be based on a vertical linear interpolation at location [x][y] in current block 904. The predicted sample p[x][y] in current block 904 may be calculated as $$p[x][y] = \frac{1}{2 \cdot s}(h[x][y] + v[x][y] + s) \qquad (3)$$

where $$h[x][y] = (s - x - 1) \cdot ref_2[y] + (x + 1) \cdot ref_1[s] \qquad (4)$$

may be the horizontal linear interpolation at location [x][y] in current block 904 and $$v[x][y] = (s - y - 1) \cdot ref_1[x] + (y + 1) \cdot ref_2[s] \qquad (5)$$

may be the vertical linear interpolation at location [x] [y] in current block 904.

For DC mode, a sample at location [x][y] in current block 904 may be predicted by the mean of the reference samples 902. The predicted value sample p[x][y] in current block 904 may be calculated as $$p[x][y] = \frac{1}{2 \cdot s}\left(\sum_{x=0}^{s-1} ref_1[x] + \sum_{y=0}^{s-1} ref_2[y]\right) \qquad (6)$$

For angular modes, a sample at location [x][y] in current block 904 may be predicted by projecting the location [x][y] in a direction specified by a given angular mode to a point on the horizontal or vertical line of samples comprising reference samples 902. The sample at location [x][y] may be predicted by interpolating between the two closest reference samples of the projection point if the projection does not fall directly on a reference sample. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC).

FIG. 12 illustrates a prediction of a sample at location [x][y] in current block 904 for a vertical prediction mode 906 given by an angle φ. For vertical prediction modes, the location [x][y] in current block 904 is projected to a point (referred to herein as the "projection point") on the horizontal line of reference samples $ref_1[x]$. Reference samples 902 are only partially shown in FIG. 12 for ease of illustration. Because the projection point falls at a fractional sample position between two reference samples in the example of FIG. 12, the predicted sample p[x][y] in current block 904 may be calculated by linearly interpolating between the two reference samples as follows $$p[x][y] = (1 - i_f) \cdot ref_1[x + i_i + 1] + i_f \cdot ref_1[x + i_i + 2] \qquad (7)$$

where $i_i$ is the integer part of the horizontal displacement of the projection point relative to the location [x][y] and may calculated as a function of the tangent of the angle φ of the vertical prediction mode 906 as follows $$i_i = \lfloor (y+1) \cdot \tan\varphi \rfloor, \qquad (8)$$

and $i_f$ is the fractional part of the horizontal displacement of the projection point relative to the location [x][y] and may be calculated as $$i_f = ((y+1) \cdot \tan\varphi) - \lfloor (y+1) \cdot \tan\varphi \rfloor. \qquad (9)$$

where $\lfloor \cdot \rfloor$ is the integer floor.

For horizontal prediction modes, the position [x][y] of a sample in current block 904 may be projected onto the vertical line of reference samples $ref_2[y]$. Sample prediction for horizontal prediction modes is given by:

$$p[x][y] = (1 - i_f) \cdot ref_2[y + i_i + 1] + i_f \cdot ref_2[y + i_i + 2] \qquad (10)$$

where $i_i$ is the integer part of the vertical displacement of the projection point relative to the location [x][y] and may be calculated as a function of the tangent of the angle φ of the horizontal prediction mode as follows $$i_i = \lfloor (x+1) \cdot \tan\varphi \rfloor, \qquad (11)$$

and $i_f$ is the fractional part of the vertical displacement of the projection point relative to the location [x][y] and may be calculated as $$i_f = ((x+1) \cdot \tan\varphi) - \lfloor (x+1) \cdot \tan\varphi \rfloor. \qquad (12)$$

where $\lfloor \cdot \rfloor$ is the integer floor.

The interpolation functions of (7) and (10) may be implemented by an encoder or decoder, such as encoder 200 in FIG. 2 or decoder 300 in FIG. 3, as a set of two-tap finite impulse response (FIR) filters. The coefficients of the two-tap FIR filters may be respectively given by $(1 - i_f)$ and $i_f$. In the above angular intra prediction examples, the predicted sample p[x][y] may be calculated with some predefined level of sample accuracy, such as 1/32 sample accuracy. For 1/32 sample accuracy, the set of two-tap FIR interpolation filters may comprise up to 32 different two-tap FIR interpolation filters—one for each of the 32 possible values of the fractional part of the projected displacement $i_f$. In other examples, different levels of sample accuracy may be used.

It should be noted that supplementary reference samples may be constructed for the case where the position [x][y] of a sample in current block 904 to be predicted is projected to a negative x coordinate, which happens with negative vertical prediction angles φ. The supplementary reference samples may be constructed by projecting the reference samples in $ref_2[y]$ in the vertical line of reference samples 902 to the horizontal line of reference samples 902 using the negative vertical prediction angle φ. Supplemental reference samples may be similarly for the case where the position [x][y] of a sample in current block 904 to be predicted is projected to a negative y coordinate, which happens with negative horizontal prediction angles φ. The supplementary reference samples may be constructed by projecting the reference samples in $ref_1[x]$ on the horizontal line of reference samples 902 to the vertical line of reference samples 902 using the negative horizontal prediction angle φ.

An encoder may predict the samples of a current block being encoded, such as current block 904, for a plurality of intra prediction modes as explained above. For example, the encoder may predict the samples of the current block for each of the 35 intra prediction modes in HEVC or 67 intra prediction modes in VVC. For each intra prediction mode applied, the encoder may determine a prediction error for the current block based on a difference (e.g., sum of squared differences (SSD), sum of absolute differences (SAD), or sum of absolute transformed differences (SATD)) between the prediction samples determined for the intra prediction mode and the original samples of the current block. The encoder may select one of the intra prediction modes to encode the current block based on the determined prediction errors. For example, the encoder may select an intra prediction mode that results in the smallest prediction error for the current block. In another example, the encoder may select the intra prediction mode to encode the current block based on a rate-distortion measure (e.g., Lagrangian rate-distortion cost) determined using the prediction errors. The encoder may send an indication of the selected intra prediction mode and its corresponding prediction error to a decoder for decoding of the current block.

Although the description above was primarily made with respect to intra prediction modes in HEVC and VVC, it will be understood that the techniques of the present disclosure described above and further below may be applied to other intra prediction modes, including those of other video coding standards like VP8, VP9, AV1, and the like.

As explained above, intra prediction may exploit correlations between spatially neighboring samples in the same picture of a video sequence to perform video compression. Inter prediction is another coding tool that may be used to exploit correlations in the time domain between blocks of samples in different pictures of the video sequence to perform video compression. In general, an object may be seen across multiple pictures of a video sequence. The object may move (e.g., by some translation and/or affine motion) or remain stationary across the multiple pictures. A current block of samples in a current picture being encoded may therefore have a corresponding block of samples in a previously decoded picture that accurately predicts the current block of samples. The corresponding block of samples may be displaced from the current block of samples due to movement of an object, represented in both blocks, across the respective pictures of the blocks. The previously decoded picture may be referred to as a reference picture and the corresponding block of samples in the reference picture may be referred to as a reference block or motion compensated prediction. An encoder may use a block matching technique to estimate the displacement (or motion) and determine the reference block in the reference picture.

Similar to intra prediction, once a prediction for a current block is determined and/or generated using inter prediction, an encoder may determine a difference between the current block and the prediction. The difference may be referred to as a prediction error or residual. The encoder may then store and/or signal in a bitstream the prediction error and other related prediction information for decoding or other forms of consumption. A decoder may decode the current block by predicting the samples of the current block using the prediction information and combining the predicted samples with the prediction error.

Figure 13A:
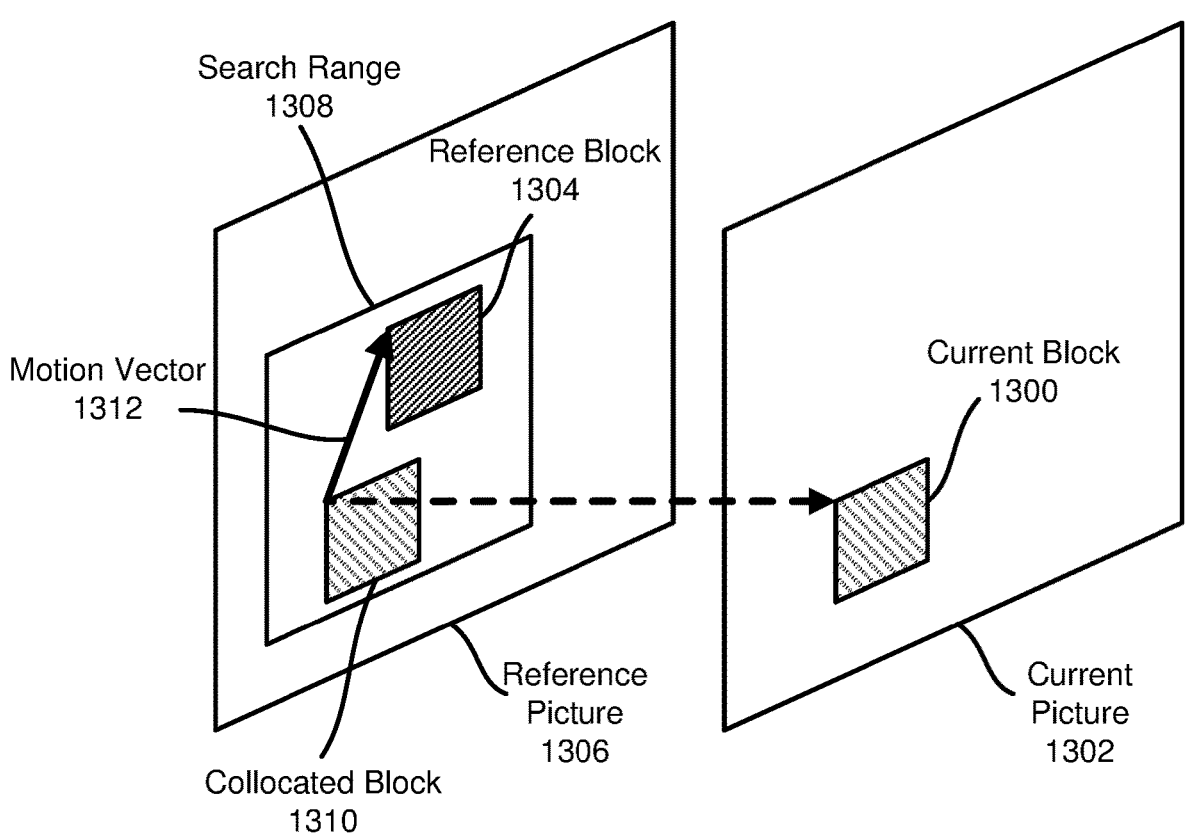
FIG. 13A illustrates an example of inter prediction performed for a current block in a current picture being encoded in accordance with embodiments of the present disclosure.

FIG. 13A illustrates an example of inter prediction performed for a current block 1300 in a current picture 1302 being encoded. An encoder, such as encoder 200 in FIG. 2, may perform inter prediction to determine and/or generate a reference block 1304 in a reference picture 1306 to predict current block 1300. Reference pictures, like reference picture 1306, are prior decoded pictures available at the encoder and decoder. Availability of a prior decoded picture may depend on whether the prior decoded picture is available in a decoded picture buffer at the time current block 1300 is being encoded or decoded. The encoder may, for example, search one or more reference pictures for a reference block that is similar to current block 1300. The encoder may determine a "best matching" reference block from the blocks tested during the searching process as reference block 1304. The encoder may determine that reference block 1304 is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), or sum of absolute transformed differences (SATD)) between the prediction samples of reference block 1304 and the original samples of current block 1300.

The encoder may search for reference block 1304 within a search range 1308. Search range 1308 may be positioned around the collocated position (or block) 1310 of current block 1300 in reference picture 1306. In some instances, search range 1308 may at least partially extend outside of reference picture 1306. When extending outside of reference picture 1306, constant boundary extension may be used such that the values of the samples in the row or column of reference picture 1306, immediately adjacent to the portion of search range 1308 extending outside of reference picture 1306, are used for the "sample" locations outside of reference picture 1306. All or a subset of potential positions within search range 1308 may be searched for reference block 1304. The encoder may utilize any one of a number of different search implementations to determine and/or generate reference block 1304. For example, the encoder may determine a set of a candidate search positions based on motion information of neighboring blocks to current block 1300.

One or more reference pictures may be searched by the encoder during inter prediction to determine and/or generate the best matching reference block. The reference pictures searched by the encoder may be included in one or more reference picture lists. For example, in HEVC and VVC, two reference picture lists may be used, a reference picture list 0 and a reference picture list 1. A reference picture list may include one or more pictures. Reference picture 1306 of reference block 1304 may be indicated by a reference index pointing into a reference picture list comprising reference picture 1306.

Figure 13B:
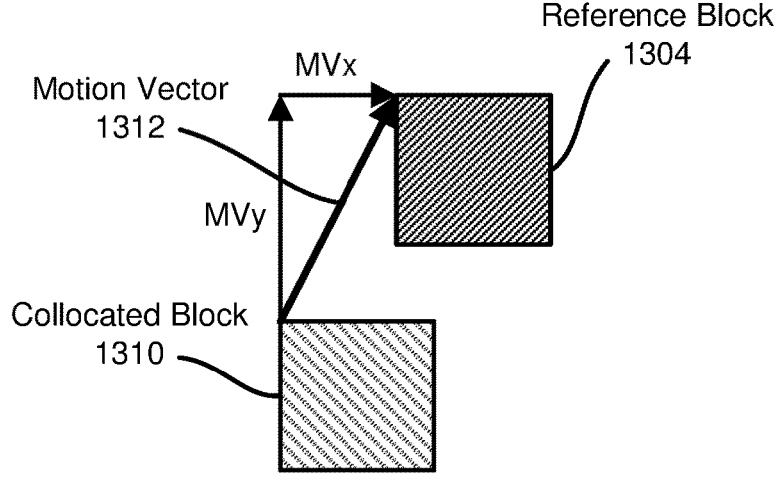
FIG. 13B illustrates an example horizontal component and vertical component of a motion vector in accordance with embodiments of the present disclosure.

The displacement between reference block 1304 and current block 1300 may be interpreted as an estimate of the motion between reference block 1304 and current block 1300 across their respective pictures. The displacement may be represented by a motion vector 1312. For example, motion vector 1312 may be indicated by a horizontal component ($MV_x$) and a vertical component ($MV_y$) relative to the position of current block 1300. FIG. 13B illustrates the horizontal component and vertical component of motion vector 1312. A motion vector, such as motion vector 1312, may have fractional or integer resolution. A motion vector with fractional resolution may point between two samples in a reference picture to provide a better estimation of the motion of current block 1300. For example, a motion vector may have ½, ¼, ⅛, ¹⁄₁₆, or ¹⁄₃₂ fractional sample resolution. When a motion vector points to a non-integer sample value in the reference picture, interpolation between samples at integer positions may be used to generate the reference block and its corresponding samples at fractional positions. The interpolation may be performed by a filter with two or more taps.

Once reference block 1304 is determined and/or generated for current block 1300 using inter prediction, the encoder may determine a difference (e.g., a corresponding sample-by-sample difference) between reference block 1304 and current block 1300. The difference may be referred to as a prediction error or residual. The encoder may then store and/or signal in a bitstream the prediction error and the related motion information for decoding or other forms of consumption. The motion information may include motion vector 1312 and a reference index pointing into a reference picture list comprising reference picture 1306. In other instances, the motion information may include an indication of motion vector 1312 and an indication of the reference index pointing into the reference picture list comprising reference picture 1306. A decoder may decode current block 1300 by determining and/or generating reference block 1304, which forms the prediction of current block 1300, using the motion information and combining the prediction with the prediction error.

Figure 14:
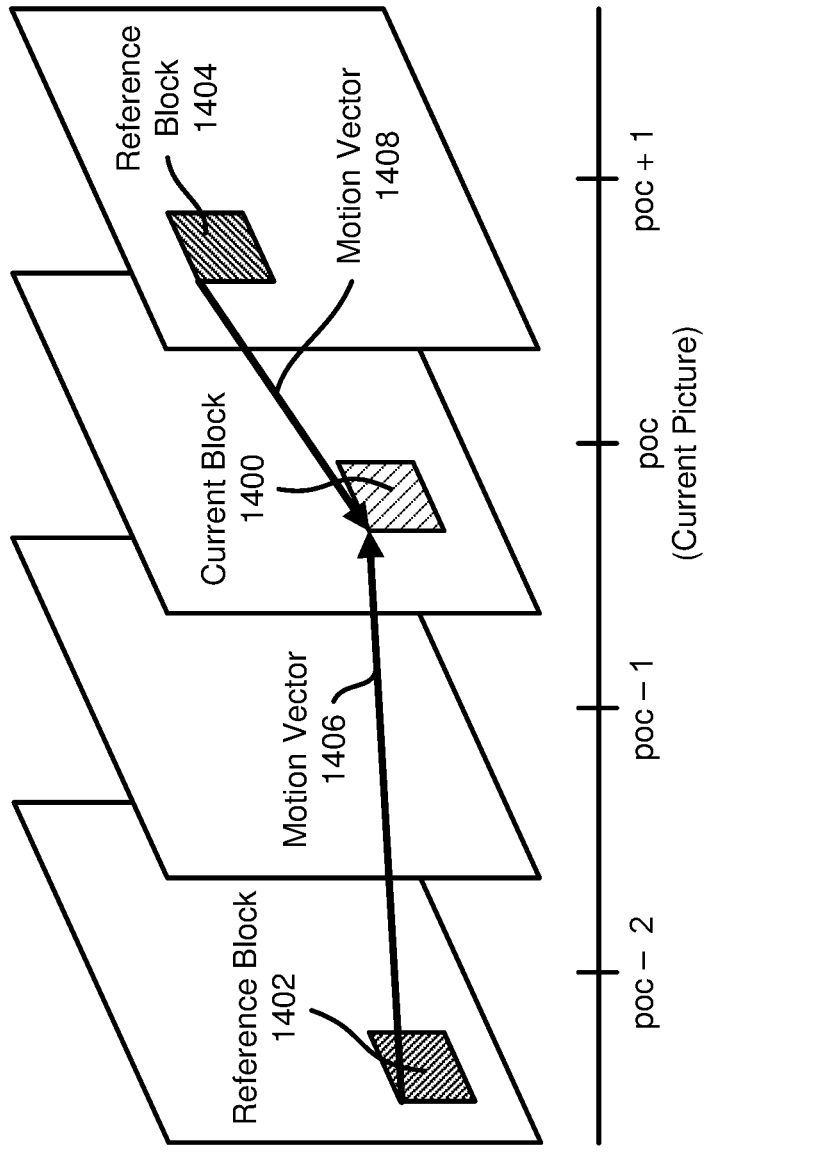
FIG. 14 illustrates an example of bi-prediction, performed for a current block in accordance with embodiments of the present disclosure.

In FIG. 13A, inter prediction is performed using one reference picture 1306 as the source of the prediction for current block 1300. Because the prediction for current block 1300 comes from a single picture, this type of inter prediction is referred to as uni-prediction. FIG. 14 illustrates another type of inter prediction, referred to as bi-prediction, performed for a current block 1400. In bi-prediction, the source of the prediction for a current block 1400 comes from two pictures. Bi-prediction may be useful, for example, where the video sequence comprises fast motion, camera panning or zooming, or scene changes. Bi-prediction may also be useful to capture fade outs of one scene or fade outs from one scene to another, where two pictures are effectively displayed simultaneously with different levels of intensity.

Whether uni-prediction or both uni-prediction and bi-prediction are available for performing inter prediction may depend on a slice type of current block 1400. For P slices, only uni-prediction may be available for performing inter prediction. For B slices, either uni-prediction or bi-prediction may be used. When uni-prediction is performed, an encoder may determine and/or generate a reference block for predicting current block 1400 from reference picture list 0. When bi-prediction is performed, an encoder may determine and/or generate a first reference block for predicting current block 1400 from reference picture list 0 and determine and/or generate a second reference block for predicting current block 1400 from reference picture list 1.

In FIG. 14, inter-prediction is performed using bi-prediction, where two reference blocks 1402 and 1404 are used to predict current block 1400. Reference block 1402 may be in a reference picture of one of reference picture list 0 or 1, and reference block 1404 may be in a reference picture of the other one of reference picture list 0 or 1. As shown in FIG. 14, reference block 1402 is in a picture that precedes the current picture of current block 1400 in terms of picture order count (POC), and reference block 1402 is in a picture that proceeds the current picture of current block 1400 in terms of POC. In other examples, the reference pictures may both precede or proceed the current picture in terms of POC. POC is the order in which pictures are output from, for example, a decoded picture buffer and is the order in which pictures are generally intended to be displayed. However, it should be noted that pictures that are output are not necessarily displayed but may undergo different processing or consumption, such as transcoding. In other examples, the two reference blocks determined and/or generated using bi-prediction may come from the same reference picture. In such an instance, the reference picture may be included in both reference picture list 0 and reference picture list 1.

A configurable weight and offset value may be applied to the one or more inter prediction reference blocks. An encoder may enable the use of weighted prediction using a flag in a picture parameter set (PPS) and signal the weighting and offset parameters in the slice segment header for the current block. Different weight and offset parameters may be signaled for luma and chroma components.

Once reference blocks 1402 and 1404 are determined and/or generated for current block 1400 using inter prediction, the encoder may determine a difference between current block 1400 and each of reference blocks 1402 and 1404. The differences may be referred to as prediction errors or residuals. The encoder may then store and/or signal in a bitstream the prediction errors and their respective related motion information for decoding or other forms of consumption. The motion information for reference block 1402 may include motion vector 1406 and the reference index pointing into the reference picture list comprising the reference picture of reference block 1402. In other instances, the motion information for reference block 1402 may include an indication of motion vector 1406 and an indication of the reference index pointing into the reference picture list comprising the reference picture of reference block 1402. The motion information for reference block 1404 may include motion vector 1408 and the reference index pointing into the reference picture list comprising the reference picture of reference block 1404. In other instances, the motion information for reference block 1404 may include an indication of motion vector 1408 and an indication of the reference index pointing into the reference picture list comprising the reference picture of reference block 1404. A decoder may decode current block 1400 by determining and/or generating reference blocks 1402 and 1404, which together form the prediction of current block 1400, using their respective motion information and combining the predictions with the prediction errors.

In HEVC, VVC, and other video compression schemes, motion information may be predictively coded before being stored or signaled in a bit stream. The motion information for a current block may be predictively coded based on the motion information of neighboring blocks of the current block. In general, the motion information of the neighboring blocks is often correlated with the motion information of the current block because the motion of an object represented in the current block is often the same or similar to the motion of objects in the neighboring blocks. Two of the motion information prediction techniques in HEVC and VVC include advanced motion vector prediction (AMVP) and inter prediction block merging.

An encoder, such as encoder 200 in FIG. 2, may code a motion vector using the AMVP tool as a difference between the motion vector of a current block being coded and a motion vector predictor (MVP). An encoder may select the MVP from a list of candidate MVPs. The candidate MVPs may come from previously decoded motion vectors of neighboring blocks in the current picture of the current block or blocks at or near the collocated position of the current block in other reference pictures. Both the encoder and decoder may generate or determine the list of candidate MVPs.

After the encoder selects an MVP from the list of candidate MVPs, the encoder may signal, in a bitstream, an indication of the selected MVP and a motion vector difference (MVD). The encoder may indicate the selected MVP in the bitstream by an index pointing into the list of candidate MVPs. The MVD may be calculated based on the difference between the motion vector of the current block and the selected MVP. For example, for a motion vector represented by a horizontal component ($MV_x$) and a vertical displacement ($MV_y$) relative to the position of the current block being coded, the MVD may be represented by two components calculated as follows:

$$MVD_x = MV_x - MVP_x \qquad (13)$$

$$MVD_y = MV_y - MVP_y \qquad (14)$$

where $MVD_x$ and $MVD_y$ respectively represent the horizontal and vertical components of the MVD, and $MVP_x$ and $MVP_y$ respectively represent the horizontal and vertical components of the MVP. A decoder, such as decoder 300 in FIG. 3, may decode the motion vector by adding the MVD to the MVP indicated in the bitstream. The decoder may then decode the current block by determining and/or generating the reference block, which forms the prediction of the current block, using the decoded motion vector and combining the prediction with the prediction error.

Figure 15A:
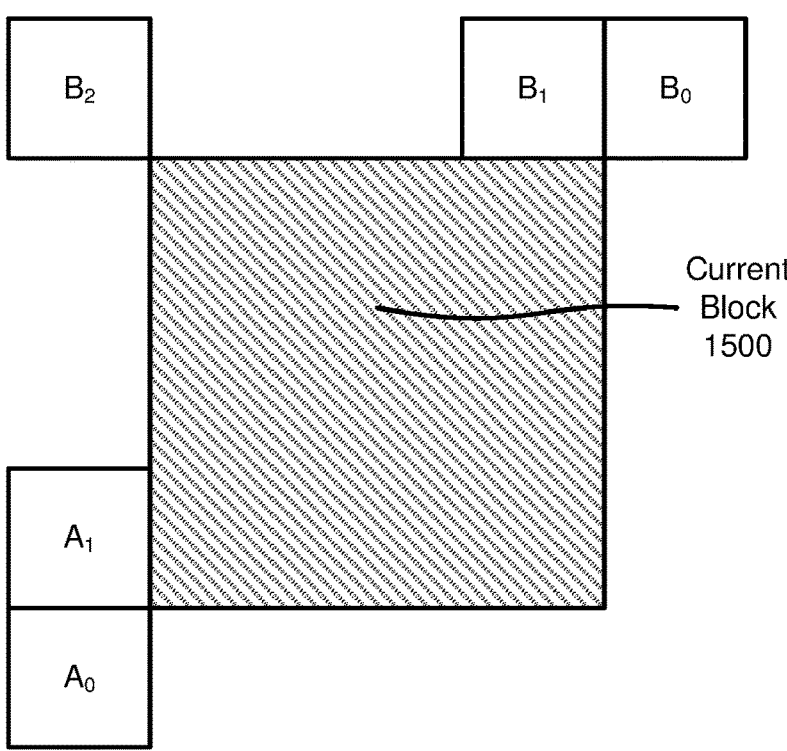
FIG. 15A illustrates an example location of five spatial candidate neighboring blocks relative to a current block being coded in accordance with embodiments of the present disclosure.
Figure 15B:
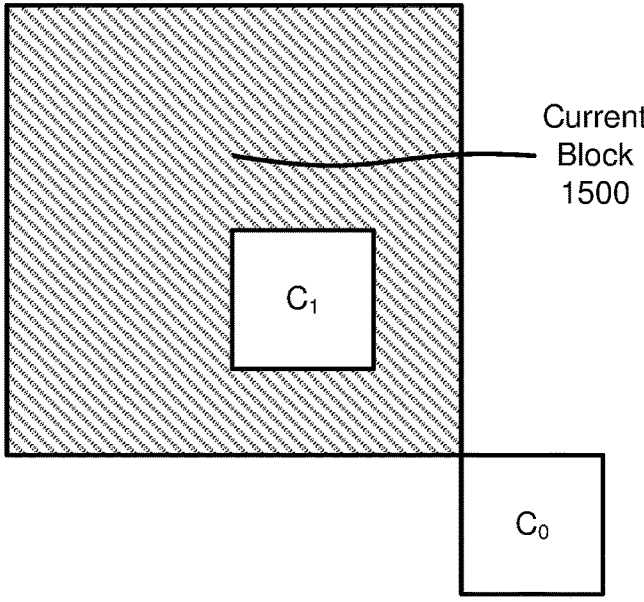
FIG. 15B illustrates an example location of two temporal, co-located blocks relative to a current block being coded in accordance with embodiments of the present disclosure.

In HEVC and VVC, the list of candidate MVPs for AMVP may comprise two candidates referred to as candidates A and B. Candidates A and B may include up to two spatial candidate MVPs derived from five spatial neighboring blocks of the current block being coded, one temporal candidate MVP derived from two temporal, co-located blocks when both spatial candidate MVPs are not available or are identical, or zero motion vectors when the spatial, temporal, or both candidates are not available. FIG. 15A illustrates the location of the five spatial candidate neighboring blocks relative to a current block 1500 being encoded. The five spatial candidate neighboring blocks are respectively denoted $A_0$, $A_1$, $B_0$, $B_1$, and $B_2$. FIG. 15B illustrates the location of the two temporal, co-located blocks relative to current block 1500 being coded. The two temporal, co-located blocks are denoted $C_0$ and $C_1$ and are included in a reference picture that is different from the current picture of current block 1500.

An encoder, such as encoder 200 in FIG. 2, may code a motion vector using the inter prediction block merging tool also referred to as merge mode. Using merge mode, the encoder may reuse the same motion information of a neighboring block for inter prediction of a current block. Because the same motion information of a neighboring block is used, no MVD needs to be signaled and the signaling overhead for signaling the motion information of the current block may be small in size. Similar to AMVP, both the encoder and decoder may generate a candidate list of motion information from neighboring blocks of the current block. The encoder may then determine to use (or inherit) the motion information of one neighboring block's motion information in the candidate list for predicting the motion information of the current block being coded. The encoder may signal, in the bit stream, an indication of the determined motion information from the candidate list. For example, the encoder may signal an index pointing into the list of candidate motion information to indicate the determined motion information.

In HEVC and VVC, the list of candidate motion information for merge mode may comprise up to four spatial merge candidates that are derived from the five spatial neighboring blocks used in AMVP as shown in FIG. 15A, one temporal merge candidate derived from two temporal, co-located blocks used in AMVP as shown in FIG. 15B, and additional merge candidates including bi-predictive candidates and zero motion vector candidates.

It should be noted that inter prediction may be performed in other ways and variants than those described above. For example, motion information prediction techniques other than AMVP and merge mode are possible. In addition, although the description above was primarily made with respect to inter prediction modes in HEVC and VVC, it will be understood that the techniques of the present disclosure described above and further below may be applied to other inter prediction modes, including those of other video coding standards like VP8, VP9, AV1, and the like. In addition, history based motion vector prediction (HMVP), combined intra/inter prediction mode (CIIP), and merge mode with motion vector difference (MMVD) as described in VVC may also be performed and are within the scope of the present disclosure.

In inter prediction, a block matching technique may be applied to determine a reference block in a different picture than the current block being encoded. Block matching techniques have also been applied to determine a reference block in the same picture as a current block being encoded. However, it has been determined that for camera-captured videos, a reference block in the same picture as the current block determined using block matching may often not accurately predict the current block. For screen content video this is generally not the case. Screen content video may include, for example, computer generated text, graphics, and animation. Within screen content, there is often repeated patterns (e.g., repeated patterns of text and graphics) within the same picture. Therefore, a block matching technique applied to determine a reference block in the same picture as a current block being encoded may provide efficient compression for screen content video.

HEVC and VVC both include a prediction technique to exploit the correlation between blocks of samples within the same picture of screen content video. This technique is referred to as intra block (IBC) or current picture referencing (CPR). Similar to inter prediction, an encoder may apply a block matching technique to determine a displacement vector (referred to as a block vector (BV)) that indicates the relative displacement from the current block to a reference block (or intra block compensated prediction) that "best matches" the current block. The encoder may determine the best matching reference block from blocks tested during a searching process similar to inter prediction. The encoder may determine that a reference block is the best matching reference block based on one or more cost criterion, such as a rate-distortion criterion (e.g., Lagrangian rate-distortion cost). The one or more cost criterion may be based on, for example, a difference (e.g., sum of squared differences (SSD), sum of absolute differences (SAD), sum of absolute transformed differences (SATD), or difference determined based on a hash function) between the prediction samples of the reference block and the original samples of the current block. A reference block may correspond to prior decoded blocks of samples of the current picture. The reference block may comprise decoded blocks of samples of the current picture prior to being processed by in-loop filtering operations, like deblocking or SAO filtering. FIG. 16 illustrates an example of IBC applied for screen content. The rectangular portions with arrows beginning at their boundaries are current blocks being encoded and the rectangular portions that the arrows point to are the reference blocks for predicting the current blocks.

Once a reference block is determined and/or generated for a current block using IBC, the encoder may determine a difference (e.g., a corresponding sample-by-sample difference) between the reference block and the current block. The difference may be referred to as a prediction error or residual. The encoder may then store and/or signal in a bitstream the prediction error and the related prediction information for decoding or other forms of consumption. The prediction information may include a BV. In other instances, the prediction information may include an indication of the BV. A decoder, such as decoder 300 in FIG. 3, may decode the current block by determining and/or generating the reference block, which forms the prediction of the current block, using the prediction information and combining the prediction with the prediction error.

In HEVC, VVC, and other video compression schemes, a BV may be predictively coded before being stored or signaled in a bit stream. The BV for a current block may be predictively coded based on the BV of neighboring blocks of the current block. For example, an encoder may predictively code a BV using the merge mode as explained above for inter prediction or a similar technique as AMVP also explained above for inter prediction. The technique similar to AMVP may be referred to as BV prediction and difference coding.

For BV prediction and difference coding, an encoder, such as encoder 200 in FIG. 2, may code a BV as a difference between the BV of a current block being coded and a BV predictor (BVP). An encoder may select the BVP from a list of candidate BVPs. The candidate BVPs may come from previously decoded BVs of neighboring blocks of the current block in the current picture. Both the encoder and decoder may generate or determine the list of candidate BVPs.

After the encoder selects a BVP from the list of candidate BVPs, the encoder may signal, in a bitstream, an indication of the selected BVP and a BV difference (BVD). The encoder may indicate the selected BVP in the bitstream by an index pointing into the list of candidate BVPs. The BVD may be calculated based on the difference between the BV of the current block and the selected BVP. For example, for a BV represented by a horizontal component ($BV_x$) and a vertical component ($BV_y$) relative to the position of the current block being coded, the BVD may represented by two components calculated as follows:

$$BVD_x = BV_x - BVP_x \tag{15}$$

$$BVD_y = BV_y - BVP_y \tag{16}$$

where $BVD_x$ and $BVD_y$ respectively represent the horizontal and vertical components of the BVD, and $BVP_x$ and BVPdy respectively represent the horizontal and vertical components of the BVP. A decoder, such as decoder 300 in FIG. 3, may decode the BV by adding the BVD to the BVP indicated in the bitstream. The decoder may then decode the current block by determining and/or generating the reference block, which forms the prediction of the current block, using the decoded BV and combining the prediction with the prediction error.

In HEVC and VVC, the list of candidate BVPs may comprise two candidates referred to as candidates A and B. Candidates A and B may include up to two spatial candidate BVPs derived from five spatial neighboring blocks of the current block being encoded, or one or more of the last two coded BVs when spatial neighboring candidates are not available (e.g., because they are coded in intra or inter mode). The location of the five spatial candidate neighboring blocks relative to a current block being encoded using IBC are the same as those shown in FIG. 15A for inter prediction. The five spatial candidate neighboring blocks are respectively denoted $A_0$, $A_1$, $B_0$, $B_1$, and $B_2$.

Figure 17:
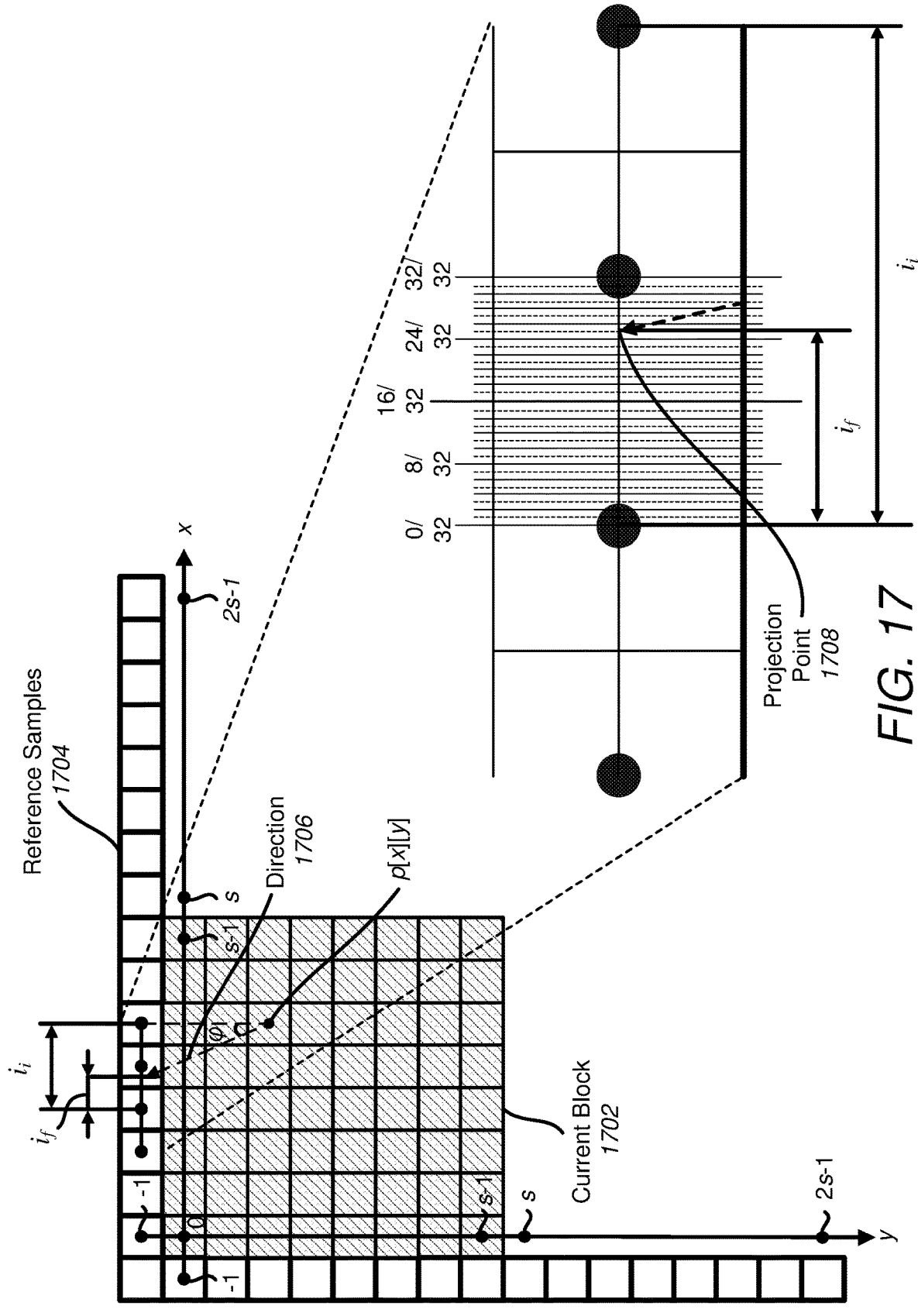
FIG. 17 illustrates an example of angular intra prediction for a current block including fractional sample positions in accordance with embodiments of the present disclosure.

FIG. 17 illustrates an example of intra prediction that may be performed for a current block 1702 in accordance with embodiments of the present disclosure. The intra prediction of FIG. 17 may be performed by an encoder, such as encoder 200 in FIG. 2. The encoder may determine reference samples 1704 for intra prediction of current block 1702. Given current block 1702 is of w×h samples in size, reference samples 1704 may extend over 2w samples of the row immediately adjacent to the top-most row of current block 1702, 2h samples of the column immediately adjacent to the left-most column of current block 1702, and the top left neighboring corner sample to current block 1702. In FIG. 17, current block 1702 is square, so w=h=s. For constructing the set of reference samples 1704, the encoder may use available samples from neighboring blocks of current block 1702 and may fill unavailable ones of reference samples 1704 using one or more different techniques.

After the encoder determines reference samples 1704, samples of current block 1702 may be intra predicted based on reference samples 1704. For example, the encoder may predict the samples of current block 1702 for each of the 35 intra prediction modes in HEVC or 67 intra prediction modes in VVC. For each intra prediction mode applied, the encoder may determine a prediction error for current block 1702 based on a difference (e.g., sum of squared differences (SSD), sum of absolute differences (SAD), or sum of absolute transformed differences (SATD)) between the predicted samples determined for the intra prediction mode and the original samples of current block 1702. The encoder may select an intra prediction mode to encode current block 1702 based on the determined prediction errors. For example, the encoder may select an intra prediction mode that results in the smallest prediction error for current block 1702. In another example, the encoder may select the intra prediction mode to encode current block 1702 based on a rate-distortion measure determined using the prediction errors. The encoder may send an indication of a selected intra prediction mode and its corresponding prediction error to a decoder for decoding of current block 1702.

For angular intra prediction modes, the encoder may predict a sample in current block 1702 by projecting the location of the sample in a direction specified by a given angular mode to a point (referred to herein as a "projection point") on the horizontal or vertical line of reference samples 1704. The direction specified by the angular mode may be given by an angle φ defined relative to the y-axis for vertical prediction modes (e.g., modes 19-34 in HEVC and modes 35-66 in VVC) and relative to the x-axis for horizontal prediction modes (e.g., modes 2-18 in HEVC and modes 2-34 in VVC). If the projection point falls at a fractional sample position between two reference samples, the encoder may apply an interpolation filter to one or more of the reference samples available at integer sample positions on each side of the projection point. The interpolation filter may filter the reference samples to interpolate a value at the fractional sample position of the projection point. The encoder may determine the predicted sample value based on the interpolated value.

For example, the encoder may predict a sample at location [x] [y] in current block 1702 by projecting the location [x][y] in a direction 1706 specified by a vertical prediction mode. Direction 1706 may be given by an angle φ defined relative to the y-axis for the vertical prediction mode. The location [x][y] may be projected to a projection point 1708 on the horizontal line of reference samples 1704. As shown in FIG. 17, projection point 1708 falls at a fractional sample position between two reference samples on the horizontal line of reference samples 1704. Projection point 1708 is defined by a displacement in the horizontal direction relative to the location [x][y] by an integer amount $i_i$ equal to two samples and a fractional amount is equal to 24/32 samples, where $i_i$ and $i_f$ may respectively be given by equations (11) and (12) above. Because projection point 1708 falls at a fractional sample position, the encoder may apply an interpolation filter to one or more of the reference samples available at integer sample positions on each side of projection point 1708. The interpolation filter may filter the reference samples to interpolate a value at the fractional sample position of projection point 1708. The encoder may determine the predicted sample p[x] [y] based on the interpolated value.

When directional intra prediction is performed for negative angles (e.g., a negative angle φ), reference samples may be extended to the left to create supplementary reference samples. This extension may be performed by calculation of fractional positions for each of the extension positions of the main reference sample. This calculation may be performed by taking horizontal displacement of an extension position from the top left neighboring corner sample of the current block and multiplying this displacement by the inverse angular parameter of an intra prediction mode.

The inverse angular parameter "invAngle" may be obtained from the angle as follows:

$$invAngle = \frac{1}{angle} \tag{17}$$

In this equation the following denotations are used. The angular parameter "angle" denotes a tangent of an angle of intra prediction direction. It is also referred to as "predIntraAngle" for lower precision and "predIntraAngleExt" for higher precision. Correspondingly, an "invAngle" denotes a cotangent of an angle of intra prediction ("angle"), which is an inverse angular prediction parameter (referred to herein as "invAngle"). When the value of the inverse angular prediction parameter has higher precision, this parameter is denoted as "invAngleExt".

As discussed herein, a tangent of an angle may have the value of horizontal displacement that corresponds to a vertical displacement equal to one sample. The term "precision" applied to the tangent of an angle herein denotes the number of bits allocated for the fractional part of the value of horizontal displacement. The sign value and the integer part of horizontal displacement may not be included in the number of bits for precision. In VVC, a fractional part of an angular parameter "angle" may have a precision of 5 bits. This precision corresponds to a minimal displacement of 1/32 of a sample, because the value of $2^5=32$ corresponds to a displacement equal to one sample. The inverse angular parameter "invAngle" may have a 9-bit precision. Similarly, the term "precision" applied to the cotangent of an angle herein denotes the number of bits allocated for the fractional part of the value of vertical displacement, which corresponds to a horizontal displacement that is equal to one sample. In a fixed-point implementation of a directional intra prediction method, precision values of an angular parameter and an inverse angular parameter may be different. In some implementations these parameters may be pre-calculated and stored in lookup tables (LUTs).

On the decoder side, an intra prediction direction may be obtained using two types of methods: (A) by parsing intra prediction mode from a bitstream; or (B) by derivation from previously reconstructed samples. A precision of an angular parameter may be increased when a block is predicted using decoder-side intra mode derivation as compared to explicit signaling of the intra prediction mode, because signaling costs for decoder-side intra mode derivation may not depend on the total number of intra prediction modes. Correspondingly, LUTs for storing "angle" and "invAngle" may be different when a precision of these parameters is increased. Consequently, when both types of intra prediction methods are present in the design of an encoder or decoder, separate LUTs may be defined for each of these two methods.

A decoder may determine whether decoder-side intra mode derivation should be performed for intra prediction. A decision on which method should be used to determine an intra prediction mode may be parsed from the bitstream. This decision may be one of the following:

Explicit signaling: parse an intra prediction mode from the bitstream. This signaling may specify a position of the intra prediction mode in the list of most-probable modes (MPM-list);

HoG-based decoder-side derivation: build a histogram of gradients from the neighboring reconstructed samples and determine the intra prediction mode using this histogram. This method is referred to as DIMD; or Template-based decoder-side derivation: obtain several intra predictions over the area of neighboring reconstructed samples for a set of intra prediction modes and select a mode that provides a minimum prediction error. This method is referred to as TIMD.

In existing technologies, when using a template-based decoder-side derivation (TIMD) method, a precision of the intra prediction mode may be higher than a precision of the modes obtained by the other two methods (e.g., explicit signaling, or HoG-based). An indication of extended precision for the determined intra prediction mode may be performed by determining a "bExtIntraDir" variable. Depending on this variable, the intra prediction may be performed with either casual precision and an "intraPredAngle" parameter, or with extended precision and an "intraPredAngleExt" parameter. In TIMD, an intra prediction mode may not be signaled in a bitstream, but rather may be derived from the neighboring reconstructed samples displaced leftwards from the top left neighboring corner sample of a current block being predicted. TIMD may use extended precision (e.g., 64 sub-pixel interpolation positions).

The extension of the reference samples may be based on the "invAngle" parameter, which may be derived from the "intraPredAngle" parameter. When directional intra prediction is performed for negative angles (e.g., a negative angle φ), reference samples may be extended to the left to create supplementary reference samples. This extension may be performed by calculation of fractional positions for each of the extension positions of the main reference sample. This calculation may be performed by taking horizontal displacement of an extension position from the top left neighboring corner sample of the current block and multiplying this displacement by the inverse angular parameter of an intra prediction mode.

However, in existing technologies, the derivation of the "invAngle" parameter may not be adapted to compensate for the differences in precisions between an "intraPredAngle" (with casual 32 sub-pixel precision) and an "intraPredAngle-Ext" (with extended 64 sub-pixel precision). Existing technologies do not offer a solution to adapting the derivation of the "invAngle" parameter based on the two different precisions of the "intraPredAngle" when directional intra prediction is performed for negative angles, including extending reference samples to the left to create supplementary reference samples and projecting by an inverse of an intra prediction angle to locate available reference samples. For example, due to the aforementioned differences in precision of an intra prediction angle, the "invAngle" parameter may also not be of an appropriate precision to perform accurate intra prediction on a subsample precision basis.

Embodiments of the present disclosure are directed to methods and apparatuses for determining a fractional projected displacement for an inverse angle by dividing a product, of the inverse angle and a position of a position of a supplementary sample, by a value used for each of at least two different precisions in accordance with embodiments of the present disclosure. An exemplary method according to embodiments of the present disclosure may include: determining an inverse angle of an intra prediction mode angle based on an indication of a precision of the intra prediction mode angle and the intra prediction mode angle, wherein the indication indicates the precision of the intra prediction mode angle from at least two different precisions; determining a fractional projected displacement by dividing a product, of the inverse angle and a position of a supplementary sample, by a value used for each of the at least two different precisions; and, calculating the supplementary sample based on an integer part of the fractional projected displacement. Another exemplary method according to embodiments of the present disclosure may include obtaining an intra prediction mode and a precision indicator of the prediction mode, determining a prediction angle parameter based on the intra prediction mode and the precision indicator, determining an inverse angle parameter based on the prediction angle parameter, and determining supplementary reference samples based on the inverse angle parameter and an inverse angle value. In an example, determining an inverse angle may be dependent on the two different potential precisions of an intra prediction angle and may utilize separate lookup tables (LUTs), which may increase compression efficiency with comparatively higher hardware and arithmetic complexity. In another example, determining an inverse angle may be independent of the two different potential precisions of an intra prediction angle and may reuse a single lookup table (LUT), which may decrease hardware and arithmetic complexity with comparatively lower compression efficiency. These and other features of the present disclosure are described further below.

Figure 18:
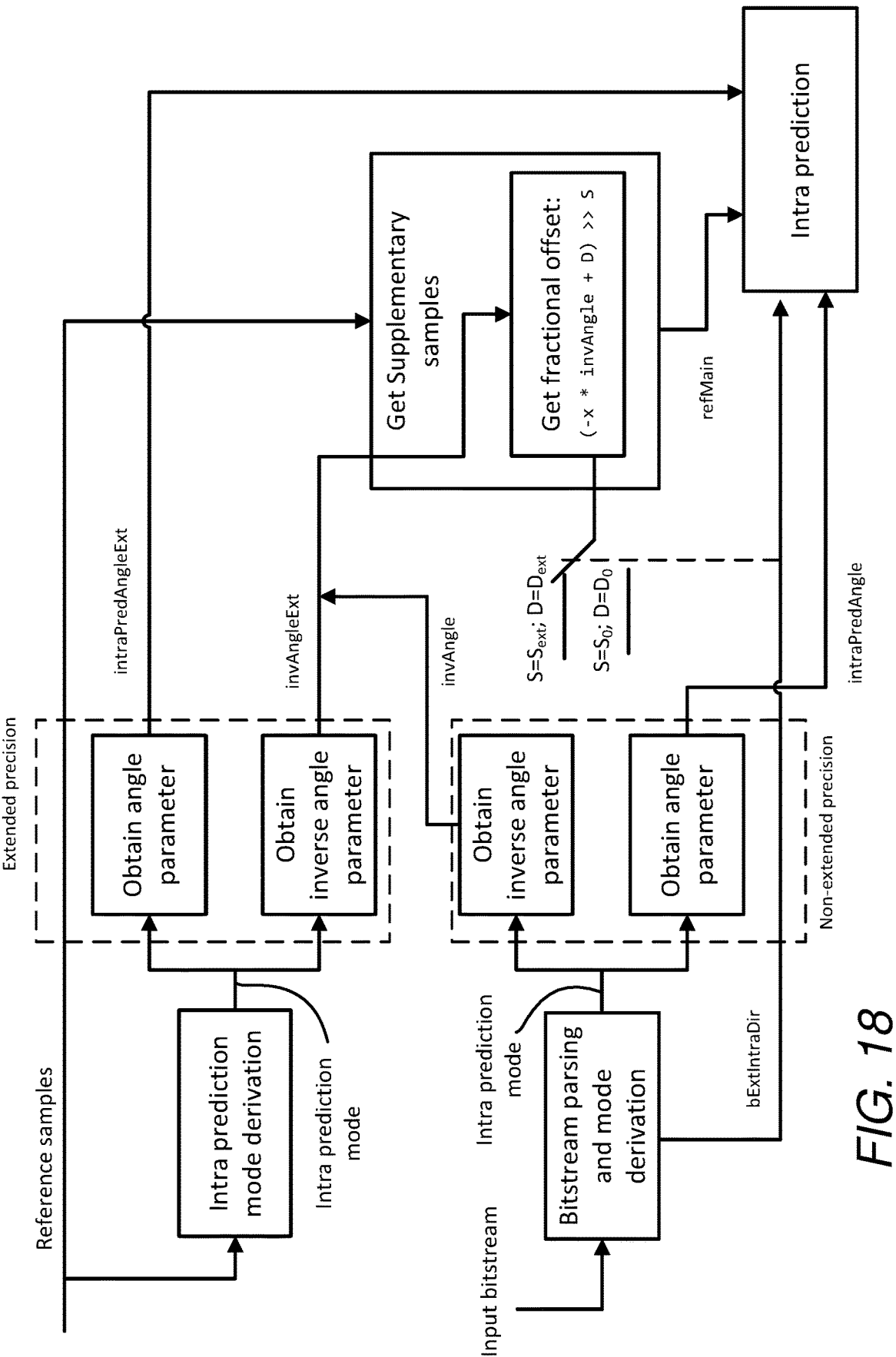
FIG. 18 illustrates an example of an intra prediction method including derivation of an intra prediction mode in accordance with embodiments of the present disclosure.

FIG. 18 illustrates an example of deriving an intra prediction mode, obtaining an inverse angle parameter, and determining supplementary samples based on a fractional offset (also referred to herein as a fractional projected displacement) of reference samples in accordance with embodiments of the present disclosure.

The flowchart of FIG. 18 illustrates an intra prediction method comprising derivation of an intra prediction mode. In FIG. 18, in the step "Bitstream parsing and mode derivation", a decoder may determine whether decoder-side intra mode derivation should be performed or not. A decision on the method to determine intra prediction mode may be parsed from a bitstream.

In FIG. 18, the step "Obtain angle parameter" may be performed differently for the cases of different precisions (extended and non-extended). The input of this step may be an intra prediction mode. Two differences are calculated, a first difference with horizontal prediction modes, and a second difference with vertical intra prediction modes (respectively denoted as HOR_IDX and VER_IDX). The two differences are compared to determine which one has a smaller absolute value. The difference having the smaller absolute value is further used to obtain the prediction parameter ("intraPredAngle" or "intraPredAngleExt"), which is denoted as Δ (delta).

When obtaining "intraPredAngleExt", the differences are calculated with the corresponding horizontal modes and vertical modes in extended precision, respectively denoted as HOR_IDX_EXT and VER_IDX_EXT. For example, when the number of directional modes is equal to 65, the horizontal modes and vertical modes may have respective indices of HOR_IDX=18 and VER_IDX=56. In another example, when the number of directional modes is equal to 129, the horizontal modes and vertical modes may have respective indices of EXT_HOR_IDX=34 and EXT_VER_IDX=98.

An example of a lookup table (LUT) to determine the absolute value of "intraPredAngle" based on the value of |Δ| is shown in Table 1. In an example, the sign of "intraPredAngle" may be defined to be same as the sign of Δ.

TABLE 1

| Determination of IntraPredAngle based on \|Δ\| | | | | | | | | | | | | | | | | |
|---|---|---|---|---|---|---|---|---|---|---|---|---|---|---|---|---|
| \|Δ\| | 0 | 1 | 2 | 3 | 4 | 5 | 6 | 7 | 8 | 9 | 10 | 11 | 12 | 13 | 14 | 15 | 16 |
| IntraPredAngle | 0 | 1 | 2 | 3 | 4 | 6 | 8 | 10 | 12 | 14 | 16 | 18 | 20 | 23 | 26 | 29 | 32 |
| \|Δ\| | 17 | 18 | 19 | 20 | 21 | 22 | 23 | 24 | 25 | 26 | 27 | 28 | 29 | 30 | 31 |
| IntraPredAngle | 35 | 39 | 45 | 51 | 57 | 64 | 73 | 86 | 102 | 128 | 171 | 256 | 341 | 512 | 1024 |

Table 2 shows an example of determination of "intraPredAngleExt" based on the value of \|Δ\|. In an example, the sign of "intraPredAngleExt" may be defined to be same as the sign of Δ.

TABLE 2

| Determination of IntraPredAngleExt based on \|Δ\| | | | | | | | | | | | | | | | | |
|---|---|---|---|---|---|---|---|---|---|---|---|---|---|---|---|---|---|
| \|Δ\| | 0 | 1 | 2 | 3 | 4 | 5 | 6 | 7 | 8 | 9 | 10 | 11 | 12 | 13 | 14 | 15 | 16 |
| IntraPredAngleExt | 0 | 1 | 2 | 3 | 4 | 5 | 6 | 7 | 8 | 10 | 12 | 14 | 16 | 18 | 20 | 22 | 24 |
| \|Δ\| | 17 | 18 | 19 | 20 | 21 | 22 | 23 | 24 | 25 | 26 | 27 | 28 | 29 | 30 | 31 | 32 | 33 |
| IntraPredAngleExt | 26 | 28 | 30 | 32 | 34 | 36 | 38 | 40 | 43 | 46 | 49 | 52 | 55 | 58 | 61 | 64 | 67 |
| \|Δ\| | 34 | 35 | 36 | 37 | 38 | 39 | 40 | 41 | 42 | 43 | 44 | 45 | 46 | 47 | 48 | 49 | 50 |
| IntraPredAngleExt | 70 | 74 | 78 | 84 | 90 | 96 | 102 | 108 | 114 | 121 | 128 | 137 | 146 | 159 | 172 | 188 | 204 |
| \|Δ\| | 51 | 52 | 53 | 54 | 55 | 56 | 57 | 58 | 59 | 60 | 61 | 62 | 63 |
| IntraPredAngleExt | 230 | 256 | 299 | 342 | 427 | 512 | 597 | 682 | 853 | 1024 | 1536 | 2048 | 3072 |

In FIG. 18, the step "Obtain inverse angle parameter" may be performed using a similar approach based on the value of Δ. Table 3 shows an example correspondence between the value of Δ and "invAngle". The sign of "invAngle" may be defined to be always positive.

TABLE 3

| Determination of invAngle based on \|Δ\| | | | | | | | | | | | | | | | | |
|---|---|---|---|---|---|---|---|---|---|---|---|---|---|---|---|---|---|
| \|Δ\| | 0 | 1 | 2 | 3 | 4 | 5 | 6 | 7 | 8 | 9 | 10 | 11 | 12 | 13 | 14 | 15 | 16 |
| invAngle | 0 | 16384 | 8192 | 5461 | 4096 | 2731 | 2048 | 1638 | 1365 | 1170 | 1024 | 910 | 819 | 712 | 630 | 565 | 512 |
| \|Δ\| | 17 | 18 | 19 | 20 | 21 | 22 | 23 | 24 | 25 | 26 | 27 | 28 | 29 | 30 | 31 |
| invAngle | 468 | 420 | 364 | 321 | 287 | 256 | 224 | 191 | 161 | 128 | 96 | 64 | 48 | 32 | 16 |

Table 4 shows and example correspondence between the value of Δ and "invAngleExt". The sign of "invAngleExt" may be defined to be always positive.

TABLE 4

| Determination of invAngleExt based on \|Δ\| | | | | | | | | | | | | | | | | |
|---|---|---|---|---|---|---|---|---|---|---|---|---|---|---|---|---|---|
| \|Δ\| | 0 | 1 | 2 | 3 | 4 | 5 | 6 | 7 | 8 | 9 | 10 | 11 | 12 | 13 | 14 | 15 | 16 |
| invAngleExt | 0 | 32768 | 16384 | 10923 | 8192 | 6554 | 5461 | 4681 | 4096 | 3277 | 2731 | 2341 | 2048 | 1820 | 1638 | 1489 | 1365 |
| \|Δ\| | 17 | 18 | 19 | 20 | 21 | 22 | 23 | 24 | 25 | 26 | 27 | 28 | 29 | 30 | 31 | 32 | 33 |
| invAngleExt | 1260 | 1170 | 1092 | 1024 | 964 | 910 | 862 | 819 | 762 | 712 | 669 | 630 | 596 | 565 | 537 | 512 | 489 |

TABLE 4-continued

| Determination of invAngleExt based on \|Δ\| | | | | | | | | | | | | | | | | |
|---|---|---|---|---|---|---|---|---|---|---|---|---|---|---|---|---|
| \|Δ\| | 34 | 35 | 36 | 37 | 38 | 39 | 40 | 41 | 42 | 43 | 44 | 45 | 46 | 47 | 48 | 49 | 50 |
| invAngleExt | 468 | 443 | 420 | 390 | 364 | 341 | 321 | 303 | 287 | 271 | 256 | 239 | 224 | 206 | 191 | 174 | 161 |

| \|Δ\| | 51 | 52 | 53 | 54 | 55 | 56 | 57 | 58 | 59 | 60 | 61 | 62 | 63 |
|---|---|---|---|---|---|---|---|---|---|---|---|---|---|
| invAngleExt | 142 | 128 | 110 | 96 | 77 | 64 | 55 | 48 | 38 | 32 | 21 | 16 | 11 |

Figure 19:
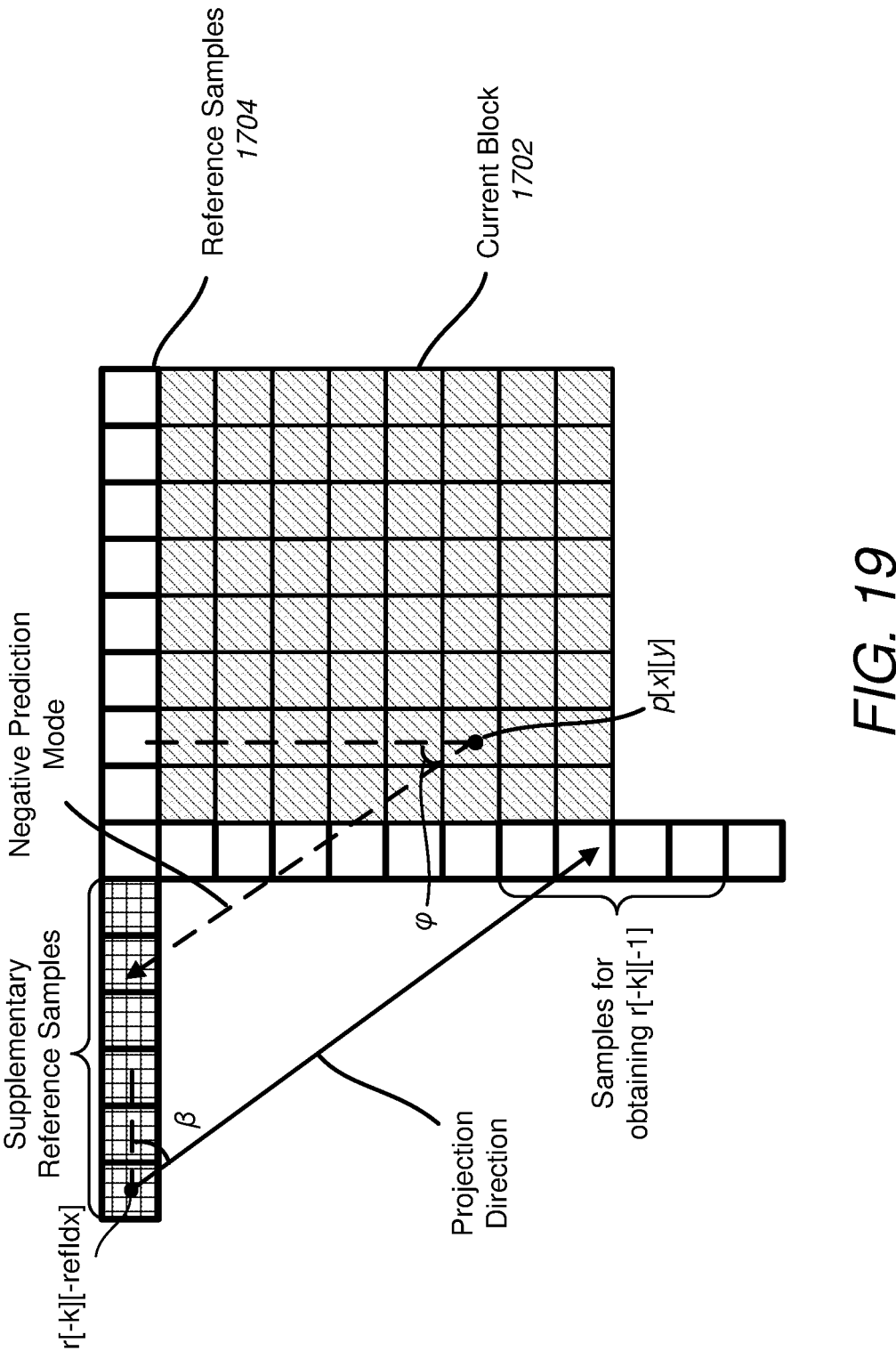
FIG. 19 illustrates an example of angular intra prediction for a current block including supplementary reference sample projection in accordance with embodiments of the present disclosure.

The step "Get supplementary samples" of FIG. 18 is further illustrated in FIG. 19. In this step, the supplementary reference samples may be determined based on an extension of the main reference sample array. The extension of the reference samples may be based on the "invAngle" parameter, which may be derived from the "intraPredAngle" parameter. When directional intra prediction is performed for negative angles (e.g., a negative angle φ), reference samples may be extended to the left to create supplementary reference samples. This extension may be performed by calculation of fractional positions for each of the extension positions of the main reference sample. This calculation may be performed by taking horizontal displacement of an extension position from the top left neighboring corner sample of the current block and multiplying this displacement by the inverse angular parameter of an intra prediction mode.

For a given integer position of a supplementary sample defined by an index "k", a corresponding fractional offset (also referred to herein as a fractional projected displacement) may be determined. In FIG. 19, this fractional offset, or fractional projected displacement, may correspond to the vertical position of the end point of the "Projection Direction" arrow defined by a relatively vertical position of the supplementary sample. According to embodiments of the present disclosure, this fractional offset, or fractional projected displacement, may be defined in 5-bit sample precision using the following equation:

$$frac32precision = (-x * invAngle + D) >> S \qquad (18)$$

Herein, the value of x denotes a horizontal position of a supplementary sample, for example, the value of "k" shown in FIG. 19. The values of the S and D parameters may be dependent on the "bExtIntraDir" variable value, i.e., a value indicating whether the obtained intra prediction mode is in extended or casual precision. When the value of "bExtIntraDir" is false, $S=S_0$ and $D=D_0$. Otherwise, $S=S_{ext}$ and $D=D_{ext}$. For example, $S_0=4$, $D_0=8$; $S_{ext}=5$, $D_{ext}=16$.

Another example of an equation for the fractional offset calculation is as follows:

$$frac32precision = \qquad (19)$$

$$bExtIntraDir? ((-k * invAngle + 16) >> 5) : ((-k * invAngle + 8) >> 4)$$

wherein (A?B:C) is a ternary operation.

Figure 20:
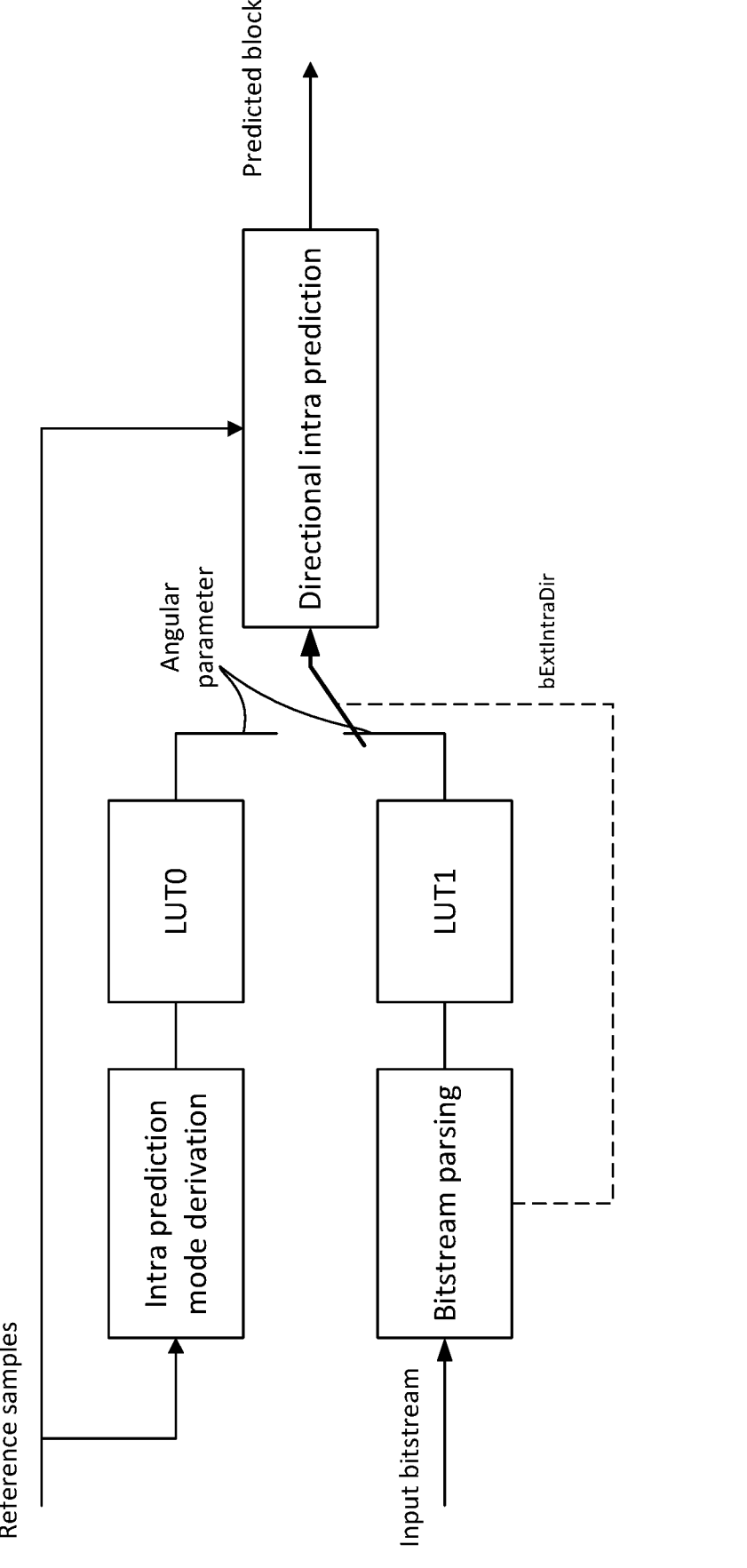
FIG. 20 illustrates an example of parsing an input bitstream to obtain an intra prediction mode and a method of intra prediction in accordance with embodiments of the present disclosure.

An example decoder implementation is shown in FIG. 20. On the decoder side, an input bitstream may be parsed to obtain an intra prediction mode and a method of intra prediction (denoted as "bExtIntraDir" herein). Based on an indication of a method of intra prediction, the decoder may determine whether to perform the step "Intra prediction mode derivation". Angular parameters "angle" and "invAngle" may be retrieved from either LUT0 or LUT1, depending on the indicated method of intra prediction. A precision (i.e., number of bits per value) of values in LUT0 for intra prediction mode derivation may be higher than a precision of values stored in LUT1.

On the encoder side, instead of parsing a bitstream, an intra prediction mode may be derived or determined. The difference between the encoder and decoder is that the encoder selects the intra prediction mode and method of intra prediction and encodes the results of this selection into the bitstream. The decoder parses the bitstream and obtains the intra prediction mode and the method of intra prediction as it was signaled in the bitstream.

Figure 21A:
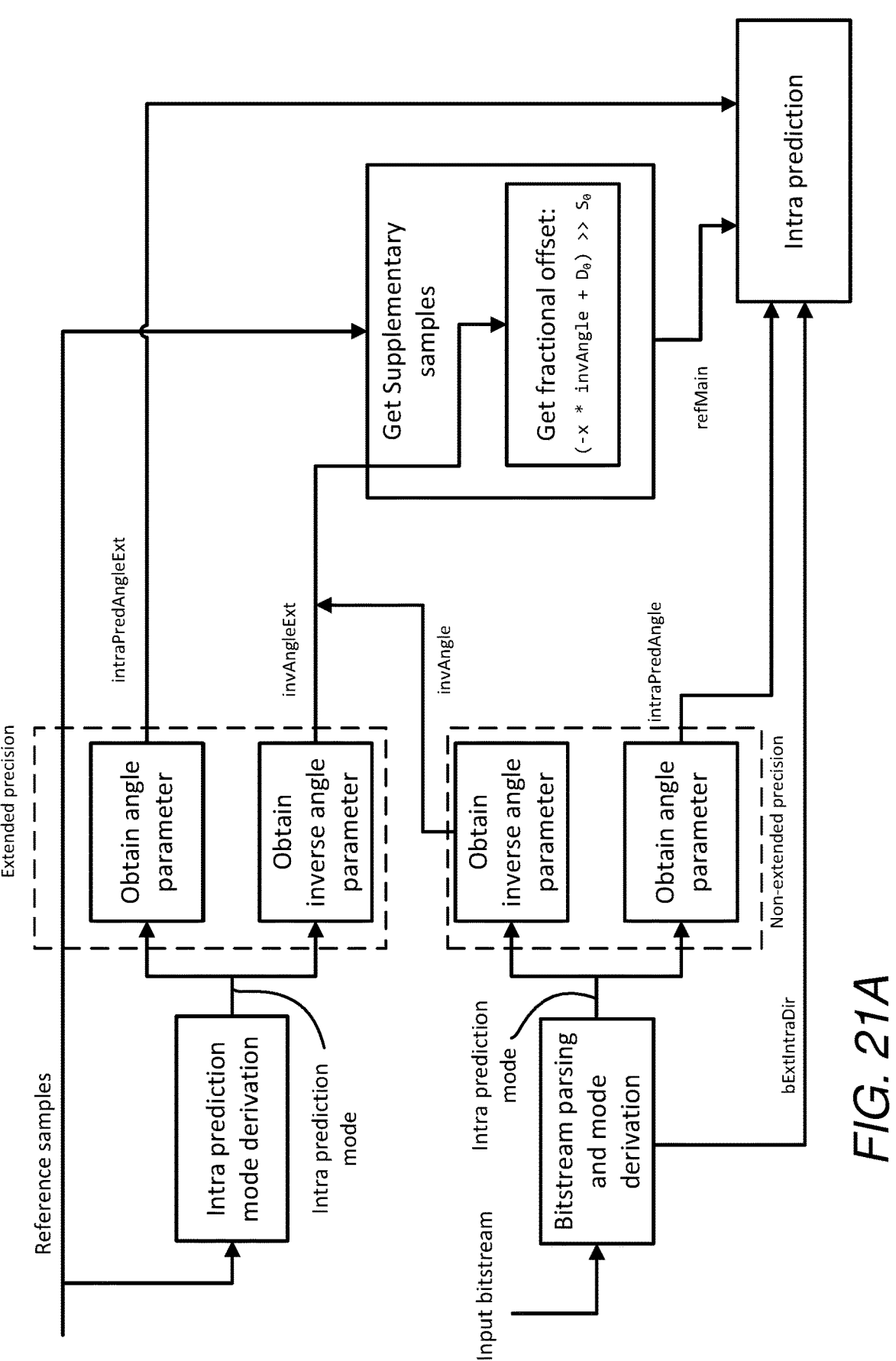
FIG. 21A illustrates an example of angular intra prediction mode derivation employing the same precision when obtaining a fractional offset in accordance with embodiments of the present disclosure.

According to an embodiment of the present disclosure shown in FIG. 21A, the "invAngle" and "invAngleExt" inverse angle parameters may be of the same precision when obtaining a fractional offset. The step "Get supplementary samples" in this case does not depend on "bExtIntraDir", and therefore, a fractional offset (also referred to herein as a fractional projected displacement) may be calculated as follows:

$$frac32precision = (-x * invAngle + D_0) >> S_0 \qquad (20)$$

For example, the values of $S_0$ and $D_0$ could be specified as follows: $S_0=4$, and $D_0=8$.

In another example, when "invAngle" is derived using Table 4, $S_0=5$, and $D_0=16$.

Figure 21B:
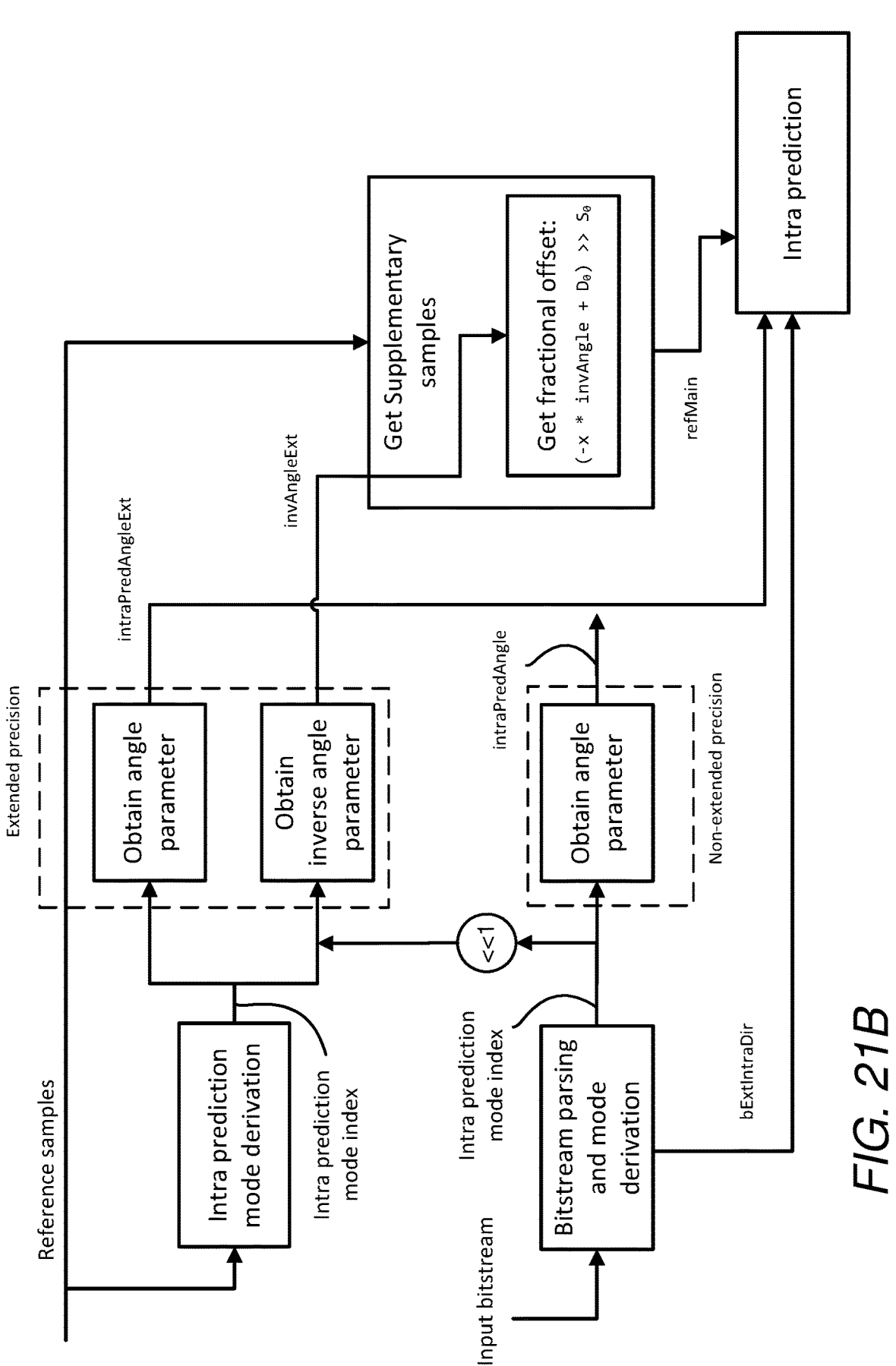
FIG. 21B illustrates an example of obtaining an inverse angle parameter unified for cases of extended and non-extended precision in accordance with embodiments of the present disclosure.

According to an embodiment of the present disclosure shown in FIG. 21B, the step of obtaining inverse angle parameter may be unified for the cases of extended and non-extended precision. An upscaling operation "<<1" may be applied to the value of \|Δ\| when "bExtIntraDir" is false. For example, this operation may be expressed as multiplication by 2.

In another example, an upscaling operation "<<1" may be applied to a non-extended mode, which may be expressed as follows:

$$modeExt = (mode < 2) ? mode:((mode << 1) - 2) \qquad (21)$$

wherein "mode" is a non-extended mode, and "modeExt" is the result of upscaling operation over non-extended mode "mode".

In the expression (21) above, "−2" offset and "<2" comparison operations may be performed to take into account non-directional PLANAR and DC modes with indices 0 and 1, respectively. In embodiments, a precision of extended and non-extended modes may differ more than two times. In this case, shift operations in the upscaling step may be adjusted accordingly.

Figure 21C:
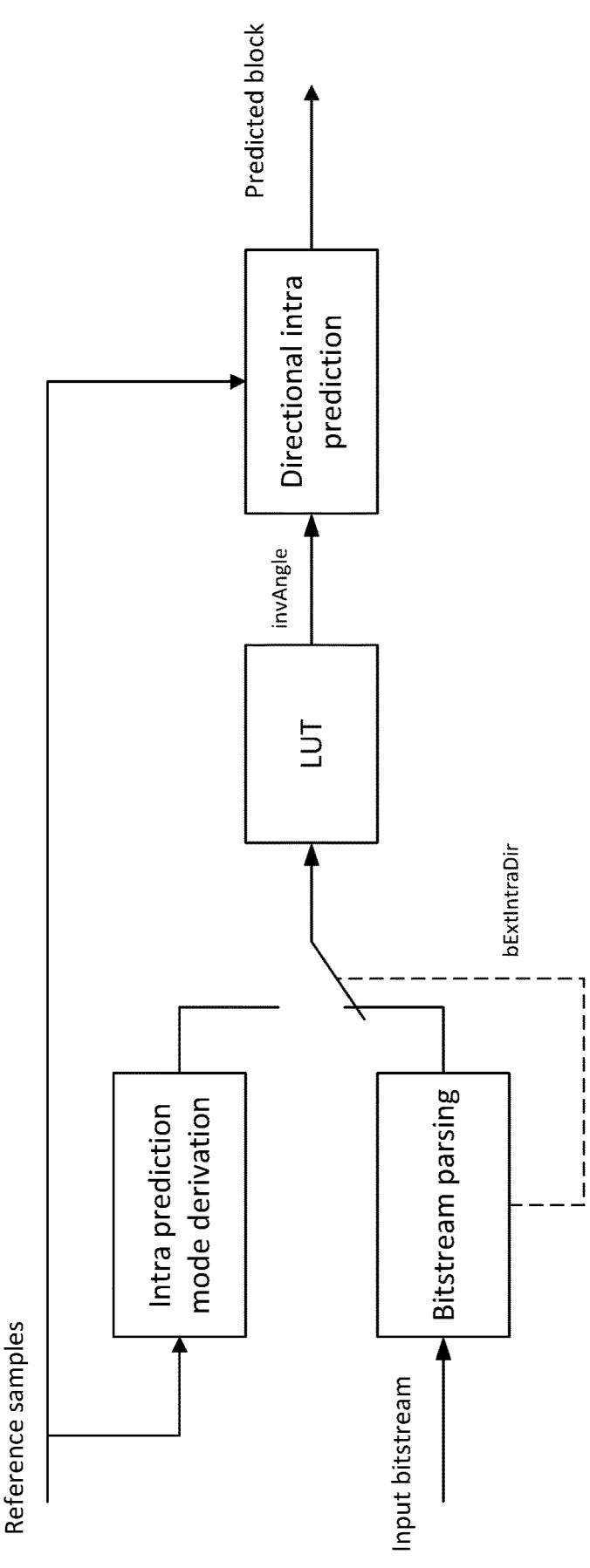
FIG. 21C illustrates an example of a single lookup table-based implementation of deriving an angular intra prediction mode for angular intra prediction in accordance with embodiments of the present disclosure.

A design flowchart of LUT-based implementations of this embodiment is shown in FIG. 21C. A single LUT may be used to obtain the "invAngle" parameter, however, the input of the lookup table may be processed in accordance with the "bExtIntraDir" value.

According to the embodiments of the present disclosure, a design of intra prediction with several methods of obtaining an intra prediction mode may utilize a single lookup table containing entries of an inverse angle. A single lookup table may be used to obtain an angular parameter for both intra prediction methods, because the precision of the inverse angle is the same for the two methods.

In the VVC standard, supplementary reference samples may be obtained based on extending main reference samples as follows.

The values of the prediction samples predSamples[x][y] (with x=0 . . . nTbW−1, y=0 . . . nTbH−1) are derived as follows. If predModeIntra is greater than or equal to 34, the following ordered steps apply:

The reference sample array ref[x] is specified as follows:

$$ref[x] = p[-1 - refIdx + x][-1 - refIdx] \qquad (22)$$

$$\text{with } x = 0 \; \dots \; nTbW + refIdx + 1$$

If intraPredAngle is less than 0, the main reference sample array is extended as follows:

$$ref[x] = \qquad\qquad\qquad (23)$$

$$p[-1 - refIdx][-1 - refIdx + \text{Min}((x * invAngle + 256) >> 9, nTbH)]$$

$$\text{with } x = -nTbH \; \dots \; 1$$

Expression (23) demonstrates nearest-neighbor interpolation to obtain a supplementary reference sample. Other intra prediction methods may use FIR interpolation filtering over the subset of samples to obtain the value of a supplementary reference sample ref[−k][−refidx]. A projection direction may be determined by the value of $$\beta = \text{atan}\left(\frac{1}{\tan\phi}\right) = \text{atan}(invAngle).$$

The precision of invAngle may be determined by the precision of the "intraPredAngle" value, for example:

$$invAngle = \text{Round}\left(\frac{512 * 32}{intraPredAngle}\right) \qquad (24)$$

A TIMD intra prediction mode may use increased precision of the "intraPredAngle". Therefore, to maintain the same precision of the inverse angle for the TIMD case, the nominator may be increased correspondingly:

$$invAngleExt = \text{Round}\left(\frac{512 * 64}{intraPredAngleExt}\right) \qquad (25)$$

Specific values of "intraPredAngle" and "intraPredAngleExt" are given in Table 5 and Table 6. In an embodiment, for negative values of "intraPredAngle", the value of "invAngle" may also be negative. Similarly, for negative values of "intraPredAngleExt", the value of "invAngleExt" may also be negative.

TABLE 5

| IntraPredAngle values | | | | | | | | | | | | | | | | | |
|---|---|---|---|---|---|---|---|---|---|---|---|---|---|---|---|---|---|
| predModeIntra | −14 | −13 | −12 | −11 | −10 | −9 | −8 | −7 | −6 | −5 | −4 | −3 | −2 | −1 | 2 | 3 | 4 |
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | | 74 | | 75 | | 76 | | 77 | | 78 | | 79 | | 80 | | |
| intraPredAngle | 73 | | 86 | | 102 | | 128 | | 171 | | 256 | | 341 | | 512 | | |

TABLE 6

| IntraPredAngleExt values | | | | | | | | | | | | | | | | |
|---|---|---|---|---|---|---|---|---|---|---|---|---|---|---|---|---|
| predModeIntra | −28 | −27 | −26 | −25 | −24 | −23 | −22 | −21 | −20 | −19 | −18 | −17 | −16 | −15 | −14 | −13 | −12 |
| IntraPredAngleExt | 1024 | 853 | 682 | 597 | 512 | 427 | 342 | 299 | 256 | 230 | 204 | 188 | 172 | 159 | 146 | 137 | 128 |
| predModeIntra | −11 | −10 | −9 | −8 | −7 | −6 | −5 | −4 | −3 | −2 | −1 | 2 | 3 | 4 | 5 | 6 | 7 |
| IntraPredAngleExt | 121 | 114 | 108 | 102 | 96 | 90 | 84 | 78 | 74 | 70 | 67 | 64 | 61 | 58 | 55 | 52 | 49 |
| predModeIntra | 8 | 9 | 10 | 11 | 12 | 13 | 14 | 15 | 16 | 17 | 18 | 19 | 20 | 21 | 22 | 23 | 24 |
| IntraPredAngleExt | 46 | 43 | 40 | 38 | 36 | 34 | 32 | 30 | 28 | 26 | 24 | 22 | 20 | 18 | 16 | 14 | 12 |
| predModeIntra | 25 | 26 | 27 | 28 | 29 | 30 | 31 | 32 | 33 | 34 | 35 | 36 | 37 | 38 | 39 | 40 | 41 |
| IntraPredAngleExt | 10 | 8 | 7 | 6 | 5 | 4 | 3 | 2 | 1 | 0 | −1 | −2 | −3 | −4 | −5 | −6 | −7 |
| predModeIntra | 42 | 43 | 44 | 45 | 46 | 47 | 48 | 49 | 50 | 51 | 52 | 53 | 54 | 55 | 56 | 57 | 58 |
| IntraPredAngleExt | −8 | −10 | −12 | −14 | −16 | −18 | −20 | −22 | −24 | −26 | −28 | −30 | −32 | −34 | −36 | −38 | −40 |
| predModeIntra | 59 | 60 | 61 | 62 | 63 | 64 | 65 | 66 | 67 | 68 | 69 | 70 | 71 | 72 | 73 | 74 | 75 |
| IntraPredAngleExt | −43 | −46 | −49 | −52 | −55 | −58 | −61 | −64 | −61 | −58 | −55 | −52 | −49 | −46 | −43 | −40 | −38 |
| predModeIntra | 76 | 77 | 78 | 79 | 80 | 81 | 82 | 83 | 84 | 85 | 86 | 87 | 88 | 89 | 90 | 91 | 92 |
| IntraPredAngleExt | −36 | −34 | −32 | −30 | −28 | −26 | −24 | −22 | −20 | −18 | −16 | −14 | −12 | −10 | −8 | −7 | −6 |
| predModeIntra | 93 | 94 | 95 | 96 | 97 | 98 | 99 | 100 | 101 | 102 | 103 | 104 | 105 | 106 | 107 | 108 | 109 |
| IntraPredAngleExt | −5 | −4 | −3 | −2 | −1 | 0 | 1 | 2 | 3 | 4 | 5 | 6 | 7 | 8 | 10 | 12 | 14 |
| predModeIntra | 110 | 111 | 112 | 113 | 114 | 115 | 116 | 117 | 118 | 119 | 120 | 121 | 122 | 123 | 124 | 125 | 126 |
| IntraPredAngleExt | 16 | 18 | 20 | 22 | 24 | 26 | 28 | 30 | 32 | 34 | 36 | 38 | 40 | 43 | 46 | 49 | 52 |
| predModeIntra | 127 | 128 | 129 | 130 | 131 | 132 | 133 | 134 | 135 | 136 | 137 | 138 | 139 | 140 | 141 | 142 | 143 |
| IntraPredAngleExt | 55 | 58 | 61 | 64 | 67 | 70 | 74 | 78 | 84 | 90 | 96 | 102 | 108 | 114 | 121 | 128 | 137 |
| predModeIntra | 144 | 145 | 146 | 147 | 148 | 149 | 150 | 151 | 152 | 153 | 154 | 155 | 156 | 157 | 158 | | |
| IntraPredAngleExt | 146 | 159 | 172 | 188 | 204 | 230 | 256 | 299 | 342 | 427 | 512 | 597 | 682 | 853 | 1024 | | |

Regarding equation (23) above, a right-shift operation may be applied to the result of multiplication of horizontal position x=−nTbH . . . 1 (denoted as "k" in FIG. 19). Compensation for the change of precision of "intraPredAngle" may be performed by making right-shift operation dependent on the precision of "intraPredAngle".

In an example, the steps to obtain supplementary reference samples are described herein with respect to the "intraPredAngle" parameter defined by Table 5 and the "intraPredAngleExt" parameter defined by Table 6 as follows. The value of the "bExtIntraDir" flag may indicate a precision of the inverse angle. It is set equal to true when an intra prediction for a block was derived using decoder-side intra prediction mode derivation, e.g., with TIMD:

$$invAngle = \begin{cases} Round\left(\dfrac{512*32}{intraPredAngle}\right), & \text{if } bExtIntraDir \text{ is false} \\ Round\left(\dfrac{512*64}{intraPredAngleExt}\right), & \text{otherwise} \end{cases} \quad (26)$$

If "intraPredAngle" is less than 0, the main reference sample array is extended as follows. The index variable iIdx and the multiplication factor iFact may be derived as follows:

$$iIdx = \big(bExtIntraDir?((x*invAngle+16)>>5): \qquad (27)$$

$$((x*invAngle+8)>>4)\big)>>5$$

$$iFact = \qquad (28)$$

$$\big(bExtIntraDir?((x*invAngle+16)>>5):((x*invAngle+8)>>4)\big) \&$$

$$31,$$

$$\text{with } x = -nTbH \ \ldots \ 1$$

The interpolation filter coefficients fT[j] with j=0 . . . 3 are derived as follows:

$$fT[j] = fC[iFact][j] \qquad (29)$$

The value of a supplementary sample ref[−x][−refidx] is derived as follows:

$$ref\big[[-x][-refidx]\big] = \tag{30}$$

$$Clip1Y\left(\left(\left(\sum\nolimits_{i=0}^{3} fT[i] * p[-refIdx][-refIdx + iIdx + i]\right) + 32\right) >> 6\right)$$

The precision of coefficients fT is 6 bits $$\left(\sum\nolimits_{i=0}^{3} fT[I] = 64\right).$$

In another example, the steps to obtain or determine supplementary reference samples may be described as follows. The value of the "bExtIntraDir" flag may indicate a precision of the inverse angle. It is set equal to true when an intra prediction for a block was derived using decoder-side intra prediction mode derivation, e.g., with TIMD:

$$invAngle = \begin{cases} \text{Round}\left(\dfrac{512 * 32}{intraPredAngle}\right), & \text{if } bExtIntraDir \text{ is false} \\ \text{Round}\left(\dfrac{512 * 64}{intraPredAngleExt}\right), & \text{otherwise} \end{cases} \tag{31}$$

If "intraPredAngle" is less than 0, the main reference sample array may be extended as follows. The value of fractional offset frac32precision is derived as follows:

$$frac32precision = \tag{32}$$

$$bExtIntraDir?((x * invAngle + 16) >> 5):((x * invAngle + 8) >> 4)$$

$$\text{with } x = -nTbH \ \dots \ 1$$

The index variable iIdx and the multiplication factor iFact are derived as follows:

$$iIdx = frac32precision >> 5 \tag{33}$$

$$iFact = frac32precision \ \& \ 31 \tag{34}$$

The interpolation filter coefficients fT[j] with j=0 . . . 3 are derived as follows:

$$fT[j] = fC[iFact][j] \tag{35}$$

The value of a supplementary sample ref[−x][−refidx] is derived as follows:

$$ref\big[[-x][-refidx]\big] = \tag{36}$$

$$Clip1Y\left(\left(\left(\sum\nolimits_{i=0}^{3} fT[i] * p[-refIdx][-refIdx + iIdx + i]\right) + 32\right) >> 6\right)$$

The precision of coefficients fT is 6 bits $$\left(\sum\nolimits_{i=0}^{3} fT[i] = 64\right).$$

In embodiments, a ternary operation denotation is used: (x?y:z). This operation has the following meaning: If x is TRUE or not equal to 0, evaluates to the value of y; otherwise, evaluates to the value of z.

According to an embodiment of the present disclosure, derivation of "invAngle" and "invAngleExt" based on Table 3 and Table 4 may be described as follows. The variable "minDistVerHor" may be equal to: Min(Abs(predModeIntra−50), Abs(predModeIntra−18).

The value of the "bExtIntraDir" flag may indicate a precision of the inverse angle. It is set equal to true when an intra prediction for a block was derived using decoder-side intra prediction mode derivation, e.g., with TIMD:

$$absInvAngle \begin{cases} invAngle[\text{min}DistVerHor], & \text{if } bExtIntraDir \text{ is false} \\ invAngleExt[\text{min}DistVerHor], & \text{otherwise} \end{cases} \tag{37}$$

If "intraPredAngle" is less than 0, the main reference sample array is extended as follows. The value of fractional offset frac32precision is derived as follows:

$$frac32precision = bExtIntraDir?((-x * absInvAngle + 16) >> 5): \tag{38}$$

$$((-x * absInvAngle + 8) >> 4)$$

$$\text{with } x = -nTbH \ \dots \ 1$$

The index variable iIdx and the multiplication factor iFact are derived as follows:

$$iIdx = frac32precision >> 5 \tag{39}$$

$$iFact = frac32precision \ \& \ 31 \tag{40}$$

The interpolation filter coefficients fT[j] with j=0 . . . 3 are derived as follows:

$$fT[j] = fC[iFact][j] \tag{41}$$

The value of a supplementary sample ref[−x][−refidx] is derived as follows:

$$ref\big[[-x][-refidx]\big] = \tag{42}$$

$$Clip1Y\left(\left(\left(\sum\nolimits_{i=0}^{3} fT[i] * p[-refIdx][-refIdx + iIdx + i]\right) + 32\right) >> 6\right)$$

The precision of coefficients fT is 6 bits $$\left(\sum\nolimits_{i=0}^{3} fT[i] = 64\right).$$

According to an embodiment of the present disclosure, the same precision of "invAngle" for both "intraPredAngle" and "intraPredAngleExt" may be maintained. The following describes the determining steps using Table 5 and Table 6 in accordance with an embodiment.

The value of the "bExtIntraDir" flag may indicate a precision of the inverse angle. It is set equal to true when an intra prediction for a block was derived using decoder-side intra prediction mode derivation, e.g., with TIMD:

$$invAngle = \begin{cases} \text{Round}\left(\dfrac{512*32}{intraPredAngle}\right), \text{if } bExtIntraDir \text{ is false} \\ \text{Round}\left(\dfrac{512*64}{intraPredAngleExt}\right), \text{otherwise} \end{cases} \quad (43)$$

If "intraPredAngle" is less than 0, the main reference sample array is extended as follows. The index variable iIdx and the multiplication factor iFact are derived as follows:

$$iIdx = ((x * invAngle + 8) \gg 4) \gg 5 \quad (44)$$

$$iFact = ((x * invAngle + 8) \gg 4) \,\&31 \quad (45)$$

$$\text{with } x = -nTbH \ldots 1$$

The interpolation filter coefficients fT[j] with j=0.3 are derived as follows:

$$fT[j] = fC[iFact][j] \quad (46)$$

The value of a supplementary sample ref[−x][−refidx] is derived as follows:

$$ref\big[[-x][-refidx]\big] = \quad (47)$$

$$Clip1Y\left(\left(\left(\sum\nolimits_{i=0}^{3} fT[I] * p[-refIdx][-refIdx + iIdx + I]\right) + 32\right) \gg 6\right)$$

The precision of coefficients fT is 6 bits $$\left(\sum\nolimits_{i=0}^{3} fT[I] = 64\right).$$

Embodiments of the present disclosure may be based on the derivation of "invAngle" and "invAngleExt" based on Table 3 and Table 4. The variable "min DistVerHor" is set equal to: Min(Abs(predModeIntra−50), Abs(predModeIntra−18)).

The value of the "bExtIntraDir" flag may indicate a precision of the inverse angle. It is set equal to true when an intra prediction for a block was derived using decoder-side intra prediction mode derivation, e.g., with TIMD:

$$absInvAngle\begin{cases} invAngle[minDistVerHor], \text{if } bExtIntraDir \text{ is false} \\ invAngleExt[minDistVerHor], \text{otherwise} \end{cases} \quad (48)$$

If intraPredAngle is less than 0, the main reference sample array is extended as follows. The value of fractional offset frac32precision is derived as follows:

$$frac32precision = (-x * absInvAngle + 8) \gg 4, \text{with } x = -nTbH \ldots 1 \quad (49)$$

38

The index variable iIdx and the multiplication factor iFact are derived as follows:

$$iIdx = frac32precision \gg 5 \quad (50)$$

$$iFact = frac32precision \,\&31 \quad (51)$$

The interpolation filter coefficients fT[j] with j=0 . . . 3 are derived as follows:

$$fT[j] = fC[iFact][j] \quad (52)$$

The value of a supplementary sample ref[−x][−refidx] is derived as follows:

$$ref\big[[-x][-refidx]\big] = \quad (53)$$

$$Clip1Y\left(\left(\left(\sum\nolimits_{i=0}^{3} fT[i] * p[-refIdx][-refIdx + iIdx + i]\right) + 32\right) \gg 6\right)$$

The precision of coefficients fT is 6 bits $$\left(\sum\nolimits_{i=0}^{3} fT[i] = 64\right).$$

Further exemplary embodiments according to the present disclosure are discussed below.

FIG. 22 illustrates a flowchart of a method for determining a fractional projected displacement for an inverse angle by dividing a product, of the inverse angle and a position of a position of a supplementary sample, by a value used for each of at least two different precisions, in accordance with embodiments of the present disclosure. More specifically, FIG. 22 illustrates a flowchart 2200 of a method for: determining an inverse angle of an intra prediction mode angle based on an indication of a precision of the intra prediction mode angle and the intra prediction mode angle, wherein the indication indicates the precision of the intra prediction mode angle from at least two different precisions; determining a fractional projected displacement by dividing a product, of the inverse angle and a position of a supplementary sample, by a value used for each of the at least two different precisions; and, calculating the supplementary sample based on an integer part of the fractional projected displacement. The method of flowchart 2200 may be implemented by an encoder, such as encoder 200 in FIG. 2, or by a decoder, such as decoder 300 in FIG. 3.

The method of flowchart 2200 begins at step 2202. At step 2202, an encoder or decoder determines an inverse angle of an intra prediction mode angle based on an indication of a precision of the intra prediction mode angle and the intra prediction mode angle, wherein the indication indicates the precision of the intra prediction mode angle from at least two different precisions. In an example, the at least two different precisions may comprise ⅟32 and ⅟64. In an example, each of the at least two different precisions may indicate a number of bits allocated for a horizontal displacement that corresponds to a vertical displacement equal to one sample.

At step 2204, an encoder or decoder a fractional projected displacement by dividing a product, of the inverse angle and a position of a supplementary sample, by a value used for each of the at least two different precisions. In an example, the value is 16. In an example, an offset may be added to the product before dividing. In an example, the position of the supplementary sample may be one of a horizontal position or a vertical position. In an example, the inverse angle may have a precision of 9 bits.

At step 2306, an encoder or decoder calculates the supplementary sample based on an integer part of the fractional projected displacement. In an example, the calculating may further include performing interpolation between two reference samples based on the integer part. In an example, the intra prediction mode angle may be a tangent of an angle of an intra prediction mode. In an example, the inverse angle may be the cotangent of the angle.

FIG. 23 illustrates a flowchart of a method for determining an inverse angle parameter based on a prediction angle parameter and determining supplementary reference samples based on the inverse angle parameter and an inverse angle value, in accordance with embodiments of the present disclosure. More specifically, FIG. 23 illustrates a flowchart 2300 of a method for obtaining an intra prediction mode and a precision indicator of the prediction mode, determining a prediction angle parameter based on the intra prediction mode and the precision indicator, determining an inverse angle parameter based on the prediction angle parameter, and determining supplementary reference samples based on the inverse angle parameter and an inverse angle value. The method of flowchart 2300 may be implemented by an encoder, such as encoder 200 in FIG. 2, or by a decoder, such as decoder 300 in FIG. 3.

The method of flowchart 2300 begins at step 2302. At step 2302, an encoder or decoder obtains an intra prediction mode and a precision indicator of the prediction mode. At step 2304, an encoder or decoder determines a prediction angle parameter based on the intra prediction mode and the precision indicator. At step 2306, an encoder or decoder determines an inverse angle parameter based on the prediction angle parameter. In an example, the prediction angle parameter may be in a fixed-point representation. In an example, the precision of the inverse angle parameter may be constant. At step 2308, an encoder or decoder determines supplementary reference samples based on the inverse angle parameter and an inverse angle value.

Embodiments of the present disclosure may be implemented in hardware using analog and/or digital circuits, in software, through the execution of instructions by one or more general purpose or special-purpose processors, or as a combination of hardware and software. Consequently, embodiments of the disclosure may be implemented in the environment of a computer system or other processing system. Furthermore, each of the steps of the flowcharts depicted in this disclosure may be implemented on one or more computer systems. In an embodiment, an encoder or decoder may comprise one or more processors and memory instructions that, when executed by the one or more processors, cause the encoder or decoder to perform the method of any of the flowcharts described herein. In an embodiment, a non-transitory computer-readable medium may comprise instructions that, when executed by one or more processors, cause the one or more processors to perform the method of any of the flowcharts described herein. In another embodiment, features of the disclosure may be implemented in hardware using, for example, hardware components such as application-specific integrated circuits (ASICs) and gate arrays. Implementation of a hardware state machine to perform the functions described herein will also be apparent to persons skilled in the relevant art.

The invention claimed is:

1. A method comprising:
   determining an inverse angle of an intra prediction mode angle based on:
   the intra prediction mode angle; and
   an indication of a precision of the intra prediction mode angle, wherein the indication indicates the precision of the intra prediction mode angle from at least two different precisions;
   determining a fractional projected displacement by dividing a product, of the inverse angle and a position of a supplementary sample, by a value used for each of the at least two different precisions; and
   calculating the supplementary sample based on an integer part of the fractional projected displacement.

2. The method of claim 1, wherein the at least two different precisions comprise $\frac{1}{32}$ and $\frac{1}{64}$.

3. The method of claim 1, wherein each of the at least two different precisions indicates a number of bits allocated for a horizontal displacement that corresponds to a vertical displacement equal to one sample.

4. The method of claim 1, wherein the value is 16.

5. The method of claim 1, wherein the calculating further comprises performing interpolation between two reference samples based on the integer part, and wherein the position of the supplementary sample is one of a horizontal position or a vertical position.

6. The method of claim 1, wherein an offset is added to the product before dividing.

7. The method of claim 1, wherein the intra prediction mode angle is a tangent of an angle of an intra prediction mode, and wherein the inverse angle is the cotangent of the angle.

8. A decoder comprising:
   one or more processors; and
   memory instructions that, when executed by the one or more processors, cause the decoder to:
   determine an inverse angle of an intra prediction mode angle based on:
   the intra prediction mode angle; and
   an indication of a precision of the intra prediction mode angle, wherein the indication indicates the precision of the intra prediction mode angle from at least two different precisions;
   determine a fractional projected displacement by dividing a product, of the inverse angle and a position of a supplementary sample, by a value used for each of the at least two different precisions; and
   calculate the supplementary sample based on an integer part of the fractional projected displacement.

9. The decoder of claim 8, wherein the at least two different precisions comprise $\frac{1}{32}$ and $\frac{1}{64}$.

10. The decoder of claim 8, wherein each of the at least two different precisions indicates a number of bits allocated for a horizontal displacement that corresponds to a vertical displacement equal to one sample.

11. The decoder of claim 8, wherein the value is 16.

12. The decoder of claim 8, wherein to calculate the supplementary sample, the decoder is further caused to perform interpolation between two reference samples based on the integer part, and wherein the position of the supplementary sample is one of a horizontal position or a vertical position.

13. The decoder of claim 8, wherein an offset is added to the product before dividing.

14. The decoder of claim 8, wherein the intra prediction mode angle is a tangent of an angle of an intra prediction mode, and wherein the inverse angle is the cotangent of the angle.

15. A non-transitory computer-readable medium comprising instructions that, when executed by one or more processors of a decoder, cause the decoder to:

determine an inverse angle of an intra prediction mode angle based on:

the intra prediction mode angle; and an indication of a precision of the intra prediction mode angle, wherein the indication indicates the precision of the intra prediction mode angle from at least two different precisions;

determine a fractional projected displacement by dividing a product, of the inverse angle and a position of a supplementary sample, by a value used for each of the at least two different precisions; and calculate the supplementary sample based on an integer part of the fractional projected displacement.

16. The non-transitory computer-readable medium of claim 15, wherein each of the at least two different precisions indicates a number of bits allocated for a horizontal displacement that corresponds to a vertical displacement equal to one sample.

17. The non-transitory computer-readable medium of claim 15, wherein the value is 16.

18. The non-transitory computer-readable medium of claim 15, wherein to calculate the supplementary sample, the decoder is further caused to perform interpolation between two reference samples based on the integer part, and wherein the position of the supplementary sample is one of a horizontal position or a vertical position.

19. The non-transitory computer-readable medium of claim 15, wherein an offset is added to the product before dividing.

20. The non-transitory computer-readable medium of claim 15, wherein the intra prediction mode angle is a tangent of an angle of an intra prediction mode, and wherein the inverse angle is the cotangent of the angle.

* * * * *